United States Patent
Kawada et al.

(10) Patent No.: US 9,075,772 B2
(45) Date of Patent: Jul. 7, 2015

(54) STORAGE APPARATUS, CONTROLLER AND STORAGE APPARATUS CONTROL METHOD

(75) Inventors: Takashi Kawada, Kawasaki (JP); Yoshinari Shinozaki, Kawasaki (JP); Shinichi Nishizono, Kawasaki (JP); Hidenori Yamada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 13/161,403

(22) Filed: Jun. 15, 2011

(65) Prior Publication Data

US 2011/0314221 A1 Dec. 22, 2011

(30) Foreign Application Priority Data

Jun. 18, 2010 (JP) .................................. 2010-139499

(51) Int. Cl.
G06F 11/20 (2006.01)
G06F 11/14 (2006.01)
G06F 3/06 (2006.01)

(52) U.S. Cl.
CPC ........ G06F 11/2071 (2013.01); G06F 11/1448 (2013.01); G06F 3/067 (2013.01); G06F 3/0689 (2013.01); G06F 11/1456 (2013.01); G06F 11/1461 (2013.01); G06F 11/1458 (2013.01)

(58) Field of Classification Search
None
See application file for complete search history.

(56) References Cited

U.S. PATENT DOCUMENTS

| 5,603,003 A | * | 2/1997 | Akizawa et al. | 711/114 |
|---|---|---|---|---|
| 5,655,150 A | * | 8/1997 | Matsumoto et al. | 710/17 |
| 5,742,792 A | * | 4/1998 | Yanai et al. | 711/162 |
| 6,009,498 A | * | 12/1999 | Kumasawa et al. | 711/113 |
| 6,038,645 A | * | 3/2000 | Nanda et al. | 711/141 |
| 6,230,240 B1 | * | 5/2001 | Shrader et al. | 711/114 |
| 6,330,642 B1 | * | 12/2001 | Carteau | 711/114 |
| 6,591,351 B1 | * | 7/2003 | Urabe et al. | 711/162 |
| 6,760,824 B2 | * | 7/2004 | Urabe et al. | 711/162 |
| 7,478,218 B2 | * | 1/2009 | Bruening et al. | 711/170 |
| 7,493,452 B2 | * | 2/2009 | Eichenberger et al. | 711/137 |
| 7,698,500 B2 | * | 4/2010 | Kuwata | 711/113 |

(Continued)

FOREIGN PATENT DOCUMENTS

| JP | 2006-268420 A | 10/2006 |
|---|---|---|
| JP | 2007-264946 A | 10/2007 |

(Continued)

OTHER PUBLICATIONS

Jaivir, Sep. 25, 2008, pp. 1, http://sawaal.ibibo.com/computers-and-technology/someone-clarify-about-cpu-cache-485093.html.*

(Continued)

*Primary Examiner* — Christopher D Birkhimer
(74) *Attorney, Agent, or Firm* — Fujitsu Patent Center

(57) ABSTRACT

An apparatus including: a first storage for storing first data; second storages for storing the first data; a storage controller for storing the first data stored in the first storage into the second storage; a third storage for saving data including second data; a saving device for reading the data and saving the data in the third storage; a data set output device for outputting the data to a copy destination device; a restoration device for storing the data saved in the third storage into available ones of the second storages; and a suspending device for causing the data set output device to output all of the data stored in the second storage to the copy destination device and then suspending the output of the data by the data set output device to the copy destination device to place the data set output device in a suspend state.

9 Claims, 21 Drawing Sheets

(56) References Cited

U.S. PATENT DOCUMENTS

| | | | |
|---|---|---|---|
| 7,702,871 B1* | 4/2010 | Arnon et al. | 711/167 |
| 7,721,056 B2* | 5/2010 | Wake | 711/162 |
| 7,721,061 B1* | 5/2010 | Kelly et al. | 711/167 |
| 7,725,664 B2* | 5/2010 | Daikokuya et al. | 711/154 |
| 7,945,750 B2 | 5/2011 | Arakawa et al. | |
| 8,041,911 B2 | 10/2011 | Matsui | |
| 2006/0190924 A1* | 8/2006 | Bruening et al. | 717/104 |
| 2008/0046657 A1* | 2/2008 | Eichenberger et al. | 711/137 |
| 2009/0204768 A1* | 8/2009 | Bruening et al. | 711/136 |
| 2010/0030986 A1 | 2/2010 | Shinozaki et al. | |

FOREIGN PATENT DOCUMENTS

| | | |
|---|---|---|
| JP | 2009-193208 A | 8/2009 |
| JP | 2010-39574 A | 2/2010 |

OTHER PUBLICATIONS

Margaret Rouse, "FIFO (First-In, First-Out)", Apr. 2005, pp. 1-3, http://whatis.techtarget.com/definition/FIFO-first-in-first-out.*

* cited by examiner

FIG. 2

| | | | DAY OF 22TH | DAY OF 23TH | | | | DAY OF 24TH | | | |
|---|---|---|---|---|---|---|---|---|---|---|---|
| | | | | 0:00 | 3:00 | 3:10 | 3:20 | 0:00 | 3:00 | 3:10 | 3:20 |
| TOKYO → NAGOYA | SESSION A | CONSISTENCY SUSPEND | | | ▓▓ | | | | ▓▓ | | |
| | | RESUME | | | | ▓▓ | | | | ▓▓ | |
| | | ASYNCHRONIZED COPY | ▓▓ | | | | ▓▓ | | | | ▓▓ |
| → OSAKA | SESSION B | REMOTE COPY | | | | | ▓▓ | | | | ▓▓ |

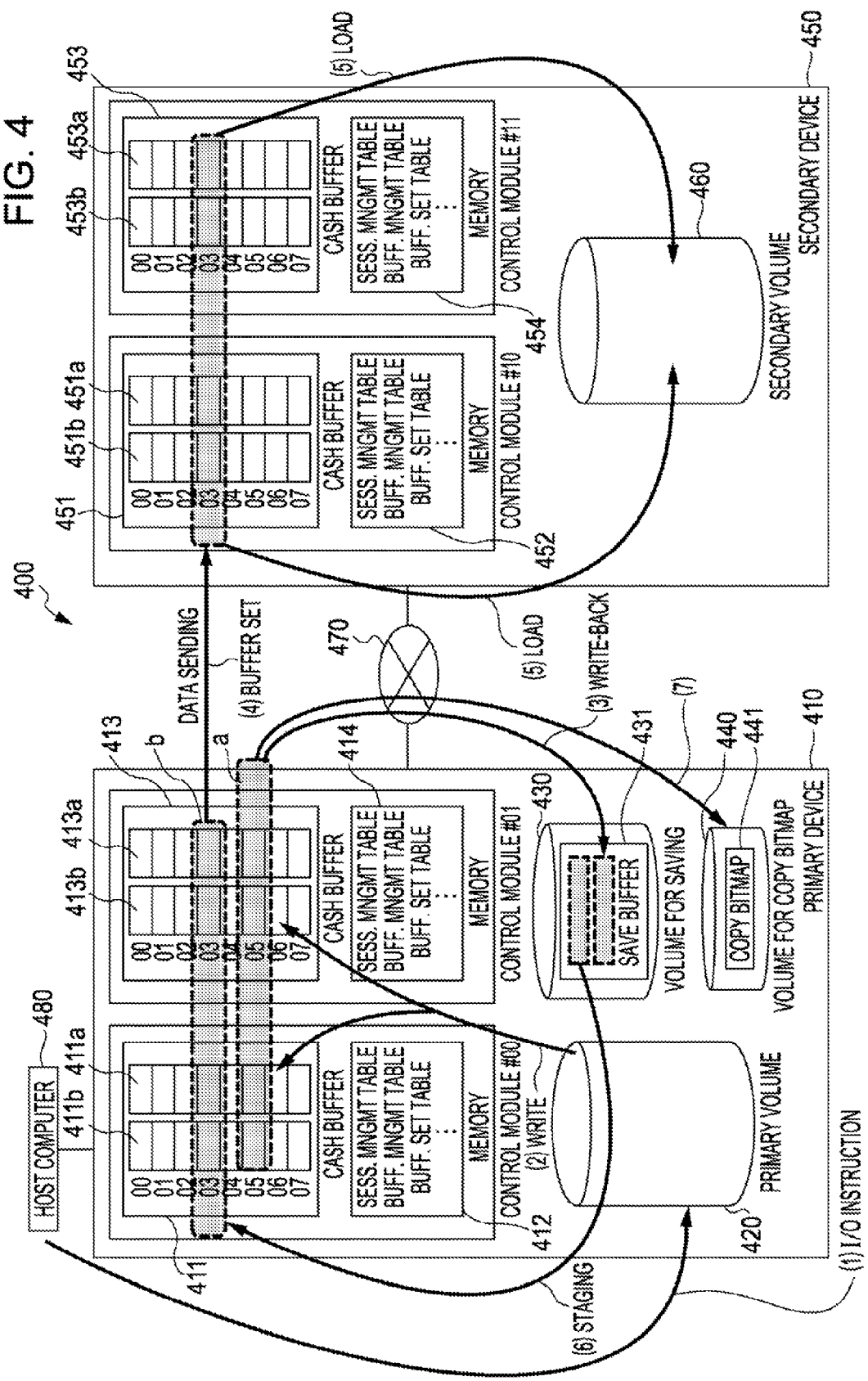

| SESSION STATUS | Active |
|---|---|
| SESSION NUMBER | 0 |
| UNTRANSFER SUSPEND COMMAND DEQUEUE MONITORING GENERATION NUMBER | 16 |
| UNTRANSFER MONITORING GENERATION NUMBER | 32 |
| UNTRANSFER SUSPEND PROCESS FLAG | OFF |
| UNTRANSFER SUSPEND COMMAND QUEUE next | NON |
| UNTRANSFER SUSPEND COMMAND QUEUE prev | NON |
| ⋮ | ⋮ |

502

| SESSION STATUS | Active |
|---|---|
| SESSION NUMBER | 1 |
| UNTRANSFER SUSPEND COMMAND DEQUEUE MONITORING GENERATION NUMBER | NO WATCHING |
| UNTRANSFER MONITORING GENERATION NUMBER | NO WATCHING |
| UNTRANSFER SUSPEND PROCESS FLAG | OFF |
| UNTRANSFER SUSPEND COMMAND QUEUE next | NON |
| UNTRANSFER SUSPEND COMMAND QUEUE prev | NON |
| ⋮ | ⋮ |

FIG. 6

| UNTRANSFER SUSPEND COMMAND QUEUE top | 0 |
|---|---|
| UNTRANSFER SUSPEND COMMAND QUEUE btm. | 0 |
| WRITE-BACK BUFFER SET top | 2 |
| WRITE-BACK BUFFER SET btm. | 3 |
| STAGING BUFFER SET top | 0 |
| STAGING BUFFER SET btm. | 1 |
| WRITE-BACK POINTER | 33 |
| STAGING POINTER | 14 |
| ⋮ | ⋮ |

| BUFFER SET NUMBER | 0 | 701 |
| --- | --- | --- |
| GENERATION NUMBER | 15 | |
| BUFFER SET LINK prev | NON | |
| BUFFER SET LINK next | 1 | |
| ⋮ | ⋮ | |

| BUFFER SET NUMBER | 1 | 702 |
| --- | --- | --- |
| GENERATION NUMBER | 16 | |
| BUFFER SET LINK prev | 0 | |
| BUFFER SET LINK next | NON | |
| ⋮ | ⋮ | |

| BUFFER SET NUMBER | 2 | 703 |
| --- | --- | --- |
| GENERATION NUMBER | 31 | |
| BUFFER SET LINK prev | NON | |
| BUFFER SET LINK next | 3 | |
| ⋮ | ⋮ | |

| BUFFER SET NUMBER | 3 | 704 |
| --- | --- | --- |
| GENERATION NUMBER | 32 | |
| BUFFER SET LINK prev | 2 | |
| BUFFER SET LINK next | NON | |
| ⋮ | ⋮ | |

FIG. 21

| | | | DAY OF 22TH | DAY OF 23TH | | | | DAY OF 24TH | | | |
|---|---|---|---|---|---|---|---|---|---|---|---|
| | | | | 0:00 0:01 0:11 | 3:00 3:10 3:11 3:21 | | | 0:00 0:01 0:11 | 3:00 3:10 3:11 3:21 | | |
| TOKYO → NAGOYA | SESSION A | UNTRANSFER SUSPEND | | | | | | | | | |
| | | RESUME | | | | | | | | | |
| | | CONSISTENCY SUSPEND | | | | | | | | | |
| | | RESUME | | | | | | | | | |
| | | ASYNCHRONIZED COPY | | | | | | | | | |
| | SESSION B | REMOTE COPY | | | | | | | | | |
| → OSAKA | SESSION C | REMOTE COPY | | | | | | | | | |

STORAGE APPARATUS, CONTROLLER AND STORAGE APPARATUS CONTROL METHOD

CROSS-REFERENCE TO RELATED APPLICATION

This application is based upon and claims the benefit of priority from the prior Japanese Patent Application NO. 2010-139499 filed on Jun. 18, 2010, the entire contents of which are incorporated herein by reference.

FIELD

The embodiments discussed herein are related to a storage apparatus including a copy function that guarantees the order of data, a controller, and a method for controlling the storage apparatus.

BACKGROUND

RAID (Redundant Arrays of Inexpensive Disks) devices, which use a distributed cache memory storage system, use a redundant configuration in which multiple control modules control input and output of data to and from a storage to improve performance and reliability. Each control module executes data read/write operations on a logical volume.

Such a RAID device includes a copy function that guarantees the order of data in order to enhance reliability.

For example, when the RAID device stores a copy of data updated by a write instruction from a host device into multiple cache buffers, the RAID device sends the data stored in the multiple cache buffers to a copy destination device in units called buffer sets in order to guarantee the order of the data.

In conjunction with the technique described above, a backup device is known that monitors the availability of write buffers storing write data. When free space of a buffer runs low, the backup device writes the data in the buffer onto a disk system such as a RAID 0 or RAID 0+1 disk system. When the free space increases to a certain level, the backup device writes the data saved on the disk system back to the buffer.

Also, a storage system is known that maintains coherency of data between volumes when multiple remote copies are performed asynchronously.

There are Patent documents in accordance with storage system. Patents documents are Japanese Laid-Open Patent Publication No. 2006-268420 and Japanese Laid-Open Patent Publication No. 2007-264946.

However, the cache buffers can run out in certain circumstances, such as where the capacity of the line interconnecting devices is low, or where the line interconnecting devices is unstable, or where the amount of data to be written by a write instruction from a host device exceeds the capacity of the cache buffers.

When a cache buffer runs out, copy that guarantees the order of data may no longer be able to be maintained.

In order to avoid exhaustion of the cache buffer to maintain copy that guarantees the order of data, a save buffer may be provided on a separate storage such as a magnetic disk device. Data on the cache buffer is temporarily saved in the save buffer depending on the availability of the cache buffer. When the data is to be sent to a copy destination device, the data can be written back from the save buffer to the cache buffer, thereby avoiding cache buffer exhaustion.

There is the function of suspending a session that is performing copy that guarantees the order of data. When a conventional RAID device receives an instruction to suspend a session that is performing copy that guarantees the order of data, the RAID device reflects the copy data for the session to be suspended in a copy destination device to make the data in the copy destination device consistent with the copy data before suspending the session. This is done in order to ensure the order of the copy data. Accordingly, the RAID device cannot suspend before the copy data in the copy destination device becomes consistent with the copy data of the session to be suspended. The process for reflecting all copy data in the copy destination device to make the data in the copy destination data consistent and then suspending the session is referred to as "consistency suspend process".

As has been described, in order for a RAID device to be consistent with the copy destination device, the copy data of the session to be suspended stored in the cache buffer of the RAID device needs to be reflected in the copy destination device.

To that end, upon reception of a suspend command from a host device, the RAID device starts monitoring copy data in a cache buffer of the session to be suspended. After all the copy data of the session to be suspended has been sent to the copy destination device, the RAID device suspends the session.

However, if a save buffer which has a large capacity is used, not only the copy data stored in the cache buffer but also the copy data stored in the save buffer need to be reflected in the copy destination device. Therefore, a large amount of time is required between reception of the suspend command from the host device and entrance into the suspend state.

As an example, an operation of a storage system 100 illustrated in FIG. 1 will be considered below.

The storage system illustrated in FIG. 1 includes a RAID device 110 located in Tokyo, a RAID device 120 located in Nagoya, and a RAID device 130 located in Osaka. The RAID devices 110 and 120 are interconnected through a network 140 so that they can communicate with each other. The RAID devices 120 and 130 are also interconnected through a network 150 so that they can communicate with each other.

FIG. 2 illustrates an exemplary backup operation of the storage system 100.

Session A executes asynchronous copy that guarantees the order of data from the RAID device 110 to the RAID device 120. Session B executes remote copy of data from the RAID device 120 to the RAID device 130.

When the RAID device 110 receives a consistency suspend instruction at 0:00 on 23, for example, the RAID device 110 initiates a consistency suspend process in session A. When the consistency suspend process is completed at 3:00 on 23, for example, all copy data of session A suspended is reflected in the RAID device 120. That is, the data in the RAID device 120 becomes consistent with the data that the RAID device 110 held at 0:00 on 23.

In session B, at 3:00 on 23 the RAID device 120 starts remote copy of data that has been updated since the last occasion to the RAID device 130. Once the remote copy has been completed, the data on the RAID device 130 becomes consistent with the data that the RAID device 110 held at 0:00 on 23.

Once the process described above has been completed, the RAID devices 120 and 130 hold the data consistent with the data that the RAID device 110 held at 0:00 on 23.

However, it takes much time for the RAID device 110 which uses a save buffer to complete the consistency suspend process as stated above. Accordingly, the probability that the storage system 100 can suffer disaster during the execution of the consistency suspend process is high.

For example, if both of the RAID device 110 in Tokyo and the RAID device 120 in Nagoya suffers disaster in the period between 0:00 and 3:10 on 23 in FIG. 2, all business data stored on 22 can be lost.

SUMMARY

According to one aspect of the embodiments, there is provided the storage apparatus including: a first storage for storing first data sent from a host device; a plurality of second storages for temporarily storing the first data; a data storage controller for storing the first data stored in the first storage into one of the plurality of second storages; a third storage used for saving a set of data including second data stored in each of the plurality of second storages; a saving device for, depending on availability of each of the plurality of second storages, reading the set of data in each of the plurality of second storages and saving the read set of data in the third storage; a data set output device for outputting the set of data stored in the each of the plurality of second storages to a copy destination device that is connected to the data set output device and is able to communicate with the data set output device; a restoration device for storing the set of data saved in the third storage into available ones of the plurality of second storages; and a suspending device for, in response to a suspend instruction, causing the data set output device to output all of the set of data stored in the plurality of second storages to the copy destination device and then suspending the output of the set of data by the data set output device to the copy destination device to place the data set output device in a suspend state.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF THE DRAWINGS

FIG. 2 is a diagram illustrating an exemplary backup operation of the storage system;

FIG. 4 is a diagram illustrating an exemplary configuration of a storage system using a RAID device according to a second embodiment;

FIG. 5 is a diagram illustrating exemplary session management tables according to the second embodiment;

FIG. 6 is a diagram illustrating an exemplary buffer management table according to the second embodiment;

FIG. 7 is a diagram illustrating exemplary buffer set tables according to the second embodiment;

FIG. 21 is a diagram illustrating an exemplary backup operation performed by the backup system according to the second embodiment.

DESCRIPTION OF EMBODIMENTS

Exemplary embodiments will be described below with reference to FIGS. 3 to 21. The embodiments described below are illustrative only and are not intended to exclude application of variations and techniques that are not explicitly stated below. Specifically, variations and combinations of the present embodiments can be carried out without departing from the spirit thereof.

First Embodiment

Figure 1:
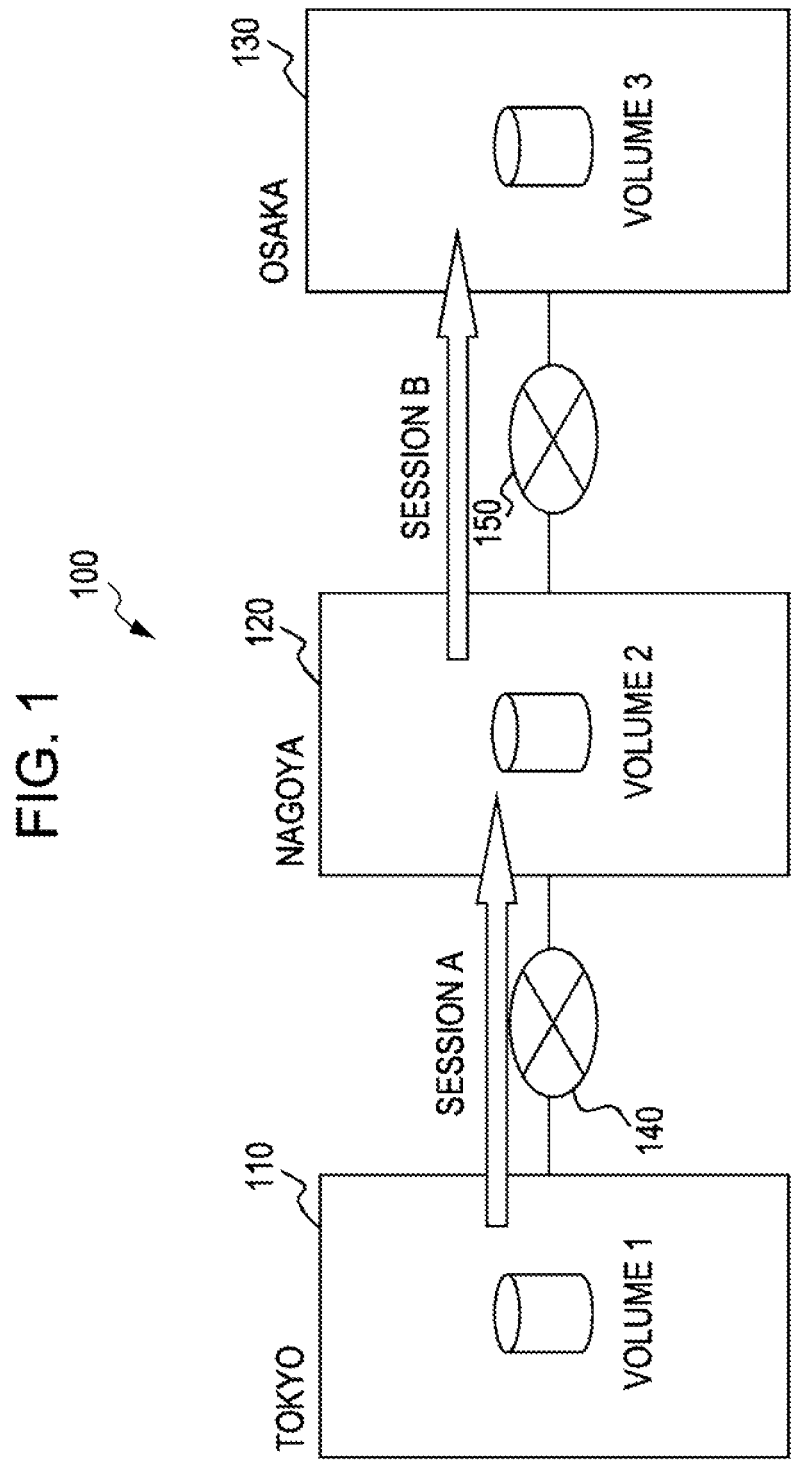
FIG. 1 is a diagram illustrating a storage system.
Figure 3:
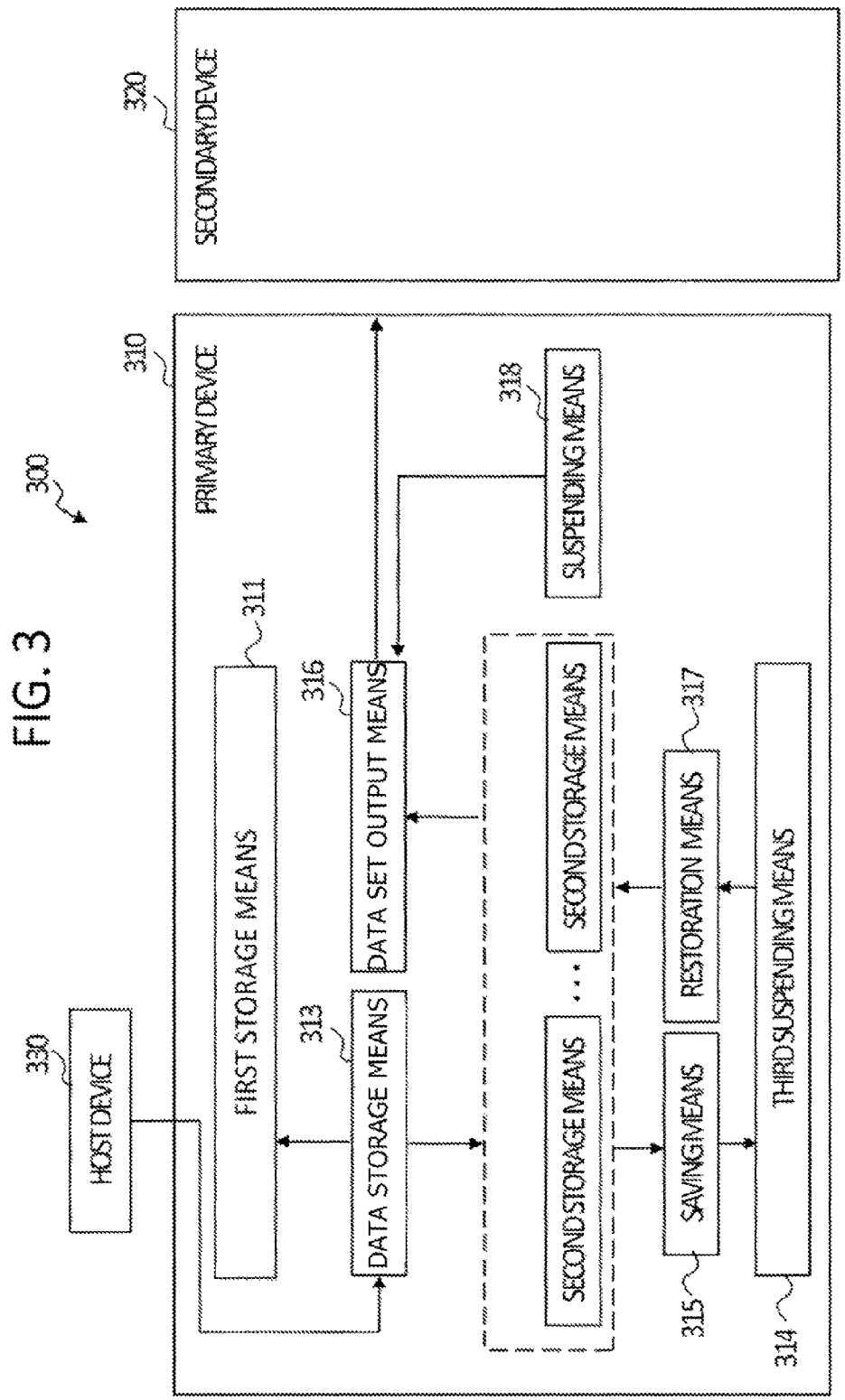
FIG. 3 is a diagram illustrating an exemplary configuration of a storage system using a storage apparatus according to a first embodiment.

FIG. 3 illustrates an exemplary configuration of a storage system 300 using a storage apparatus according to an embodiment.

The storage system 300 includes a primary device 310, which is a storage apparatus according to the present embodiment, and a secondary device 320, which is a storage apparatus used as a backup for the primary device 310. The primary and secondary devices 310 and 320 are interconnected through a network, an exclusive line or radio so that they can communicate with each other.

The primary device 310 includes first storage means 311, multiple second storage means 312, data storing means 313, third storage means 314, saving means 315, data set output means 316, restoration means 317, and suspending means 318. The primary device 310 is a distributed cache memory RAID device including multiple second storage means 312.

The first storage means 311 stores first data, for example write data specified by an I/O instruction such as a write instruction, sent from a host device 330. The first storage means 311 may be a disk array containing multiple magnetic disk devices.

The second storage means 312 temporarily stores first data. The first data is stored in the second storage means 312. The second storage means 312 may be a nonvolatile memory such as a RAM (Random Access Memory).

The data storing means 313 receives first data from the host device 330, stores the first data in the first storage means 311 and in the second storage means 312.

The third storage means 314 is used for temporarily saving a set of data including second data stored in each of the multiple second storage means 312. Like the first storage means 311, the third storage means 314 may be a disk array containing multiple magnetic disk devices.

The saving means 315 reads a set of data from the second storage means 312 and saves the set of data in the third storage means 314 depending on the availability of the second storage means 312, for example when the space occupancy rate of the second storage means 312 exceeds a threshold value. In doing this, the saving means 315 can save the set of data stored in the second storage means 312 into the third storage means 314 in order, the latest data first.

The data set output means 316 outputs data stored in the second storage means 312 to the secondary device 320 on a data-set-by-data set basis in order to guarantee the order of the data. Upon reception of a set of data sent from the primary device 310, the secondary device 320 reflects the set of data in storage means contained in the secondary device 320. The set of data is copied between the primary device 310 and the secondary device 320 with the order of the data being guaranteed. The data copy can be performed asynchronously.

The restoration means 317 stores a set of data saved in the third storage means 314 into available ones of the multiple second storage means 312 for example in the order in which the data were saved. The available ones of the multiple second storage means 312 can include second storage means 312 freed because a set of data has been output to the secondary device 320 and second storage means 312 freed with a space occupancy rate that decreased below a threshold value.

The suspending means 318 causes the data set output means 316 to output all of the set of data stored in the second storage means 312 to the secondary device 320 in response to a suspend instruction. The suspending means 318 then causes the data set output means 316 to suspend the process for outputting the set of data to the secondary device 320. The term "suspend" refers to temporarily halting data set copy from the primary device 310 to the secondary device 320.

In this way, the primary device 310 outputs all of the set of data stored in the second storage means 312 to the secondary device 320 in response to a suspend instruction from the host device 330, for example. As a result, all of the set of data stored in the second storage means 312 is reflected in the secondary device 320 with the order of the data being guaranteed upon receiving a suspend instruction.

The primary device 310 can quickly suspend in response to a suspend instruction because the primary device 310 outputs only the set of data stored in the second storage means 312 to the secondary device 320 before entering the suspend state.

Consequently, data updated in the primary device 310 can be backed up to the secondary device 320 in a short time from the reception of suspend instruction with the order of the data being guaranteed. Furthermore, backup for the secondary device 320 can also be performed quickly.

Highly disaster-tolerant backup can be performed because the probability that the storage system 300 may suffer disaster during the period between reception of a suspend instruction and entrance into the suspend state can be reduced.

Second Embodiment

FIG. 4 illustrates an exemplary configuration of a storage system 400 using a RAID device according to a second embodiment.

The storage system 400 includes a primary device 410, which is a RAID device according to the embodiment, and a secondary device 450, which is a RAID device used as a backup for the primary device 410. The primary device 410 and the secondary device 450 are interconnected through a network 470 so that they can communicate with each other.

The primary device 410 is a distributed cache memory RAID device including control modules #00 and #01, a primary volume 420, a save volume 430, and copy bitmap volume 440.

The control module #00 includes a cache buffer 411 and a memory 412 storing session management tables 500, a buffer management table 600 and buffer set tables 700, which will be described later.

The cache buffer 411 and the memory 412 may be non-volatile memories such as RAMs. The cache buffer 411 includes eight send data buffers 411a and eight management data buffers 411b.

The send data buffers 411a store send data, that is, a part of buffer set data to be sent to the secondary device 450. The management data buffers 411b store management data, which is information used for managing the send data, such as storage location of the send data.

The control module #00 executes I/O instructions issued from the host computer 480. The control module #00 uses the buffer management table 600 and the buffer set tables 700 stored in the memory 412 to perform asynchronous copy that guarantees the order of data. The embodiment will be described with respect to an asynchronous copy process by way of example. However, it is not intended to limit the copy to asynchronous copy.

The control module #00 uses the session management tables 500, the buffer management table 600 and the buffer set tables 700 to suspend asynchronous copy that is being executed.

In the present embodiment, the process for suspending asynchronous copy is referred to as "suspend process". Particularly, a suspend process without transferring buffer set data saved in the save buffer 431 is referred to as "untransfer suspend process". The untransfer suspend process is performed on a session-by-session basis.

The control module #01 includes a cache buffer 413 and a memory 414 storing session management tables 500, a buffer management table 600 and buffer set tables 700, which will be described later.

The cache buffer 413 and the memory 414 may be non-volatile memories such as RAMs. The cache buffer 413 includes eight send data buffers 413a and eight management data buffers 413b.

The send data buffers 413a store send data, that is, a part of buffer set data to be sent to the secondary device 450. The management data buffers 413b store management data, which is information used for managing the send data, such as storage location of the send data.

The control module #01 uses the buffer management table 600 and the buffer set tables 700 stored in the memory 412 to perform asynchronous copy that guarantees the order of data. The control module #01 uses the session management tables 500, the buffer management table 600 and the buffer set tables 700 to suspend asynchronous copy that is being executed.

In the primary device 410, the control module #00 acts as a master control module. The control module #01 executes asynchronous copy that guarantees the order of data and the untransfer suspend process according to instructions from the control module #00. For simplicity, the agent of processes performed by the control modules #00 and #01 in cooperation will be collectively referred to as the "control module #00" herein.

The primary volume 420, the save volume 430 and the copy bitmap volume 440 are storage units, which may be implemented by a disk array containing multiple magnetic disk devices.

The primary volume 420 is a storage unit storing write data specified in an I/O instruction from the host computer 480. The primary volume 420 according to the present embodiment includes two logical volumes. One of the logical volume is associated with the control module #00 and the other is associated with the control module #01.

The save volume 430 is a storage unit including a save buffer 431. The save buffer 431 is a storage area reserved for saving buffer set data.

The copy bitmap volume 440 is a storage unit including a copy bitmap 441. The copy bitmap 441 is a bitmap table provided for each session.

The bits contained in the copy bitmap 441 are associated with the locations of storage areas which have a predetermined size and is contained in the primary volume 420. For example, "1" is set in a bit associated with the location of a storage area contained in the primary volume 420 updated with the write data. In this way, the location of the storage area in the primary volume 420 in which write data has been written, that is, write data received from the host computer 480, is stored in the copy bitmap 441 in the bitmap format.

The secondary device 450 is a distributed cache memory RAID device including control modules #10 and #11 and a secondary volume 460.

The control module #10 includes a cache buffer 451 and a memory 452 storing information including session management tables 500, a buffer management table 600 and buffer set tables 700, which will be described later.

The cache buffer 451 and the memory 452 may be non-volatile memories such as RAMs. The cache buffer 451 includes eight received data buffers 451a and eight management data buffers 451b.

The received data buffers 415a store received data, that is, a part of buffer set data received from the primary device 410. The management data buffers 451b store management data, which is information used for managing the received data, such as the storage location of the received data.

The control module #10 uses the buffer management table 600 and the buffer set tables 700 stored in the memory 452 to execute asynchronous copy that guarantees the order of data.

The control module #11 includes a cache buffer 453 and a memory 454 storing session management tables 500, a buffer management table 600, and buffer set tables 700, which will be described later.

The cache buffer 453 and the memory 454 may be non-volatile memories such as RAMs. The cache buffer 453 includes eight received data buffers 453a and eight management data buffers 453b.

The received data buffers 453a store received data, that is, a part of buffer set data received from the primary device 410. The management data buffers 453b store management data, which is information used for managing the received data, such as the storage location of the received data.

The control module #11 uses the buffer management table 600 and the buffer set tables 700 stored in the memory 454 to execute asynchronous copy that guarantees the order of data.

In the secondary device 450, the control module #10 acts as a master control module. The control module #11 executes the asynchronous copy that guarantees the order of data according to instructions from the control module #10. For simplicity, the agent of processes performed by the control modules #10 and #11 in cooperation will be collectively referred to as the "control module #10" herein.

The secondary volume 460 is a storage unit, which may be implemented by a disk array including multiple magnetic disk devices. The secondary volume 460 stores buffer set data sent from the primary device 410.

An overview of operation of the storage system 400 will be provided below. Items (1) to (7) given below correspond to labels (1) to (7), respectively, in FIG. 4. The numbers are not intended to limit the order of operations performed in the storage system 400.

(1) When the host computer 480 issues an I/O instruction, for example a write instruction, to the primary device 410, the control module #00 writes write data into the primary volume 420 according to the I/O instruction.

(2) The control module #00 distributes the write data written in the primary volume 420 across a send data buffers 411a in the cache buffer 411 and a send data buffers 413a in the cache buffer 413.

To "distribute" means storing send data in a send data buffer 411a in the cache buffer 411 or storing send data in a send data buffer 413a in the cache buffer 413, depending on the data.

In the present embodiment, write data written in the logical volume associated with the control module #00 out of the logical volumes provided in the primary volume 420 is stored in a send data buffer 411a in the cache buffer 411 by the control module #00; write data written in the logical volume associated with the control module #01 out of the logical volumes provided in the primary volume 420 is stored in a send data buffer 413a in the cache buffer 413 by the control module #01.

Data distributed across the send data buffers 411a and 413a are managed in pairs of send data buffer 411a and 413a, that is, on a buffer-set-by-buffer-set basis. Generation numbers are assigned to buffer set data stored in the buffer sets as identification numbers in the order in which the data are stored in the buffer sets. Accordingly, data with higher numbers are older data.

In the example in FIG. 4, eight buffer sets are provided because there are eight send buffers in each of the cache buffer 411 and the cache buffer 413. The buffer sets are given buffer set identification numbers 00 to 07 in the present embodiment. For example, numbers 00 to 07 in the cache buffers 411 and 413 and cache buffers 451 and 453 in FIG. 4 represent the buffer set numbers.

(3) When the space occupancy rate of the cache buffers 411 and 413 exceeds a threshold value, the control module #00 makes write-back to save the newest generation among the buffer set data stored in the buffer sets into the save buffer 431. In the example in FIG. 4, the buffer set data stored in buffer set a with buffer set number 05 is written back into the save buffer 431.

(4) The control module #00 performs a matching process and then sends the buffer set data stored in the buffer sets to the secondary device 450 in descending order of generations. In the matching process, a combination of a buffer set on the primary device 410 in which buffer set data to be sent is stored and a buffer set on the secondary device 450 in which the buffer set data to be sent is stored is determined.

(5) In the secondary device 450, on the other hand, the control module #10 stores the buffer set data received from the primary device 410 into the buffer set determined by the matching process. Once the control module #10 have stored all the buffer set data received from the primary device 410 into the buffer set, the control module #10 loads the buffer set data in the secondary volume 460. Since data are sent from the primary device 410 to the secondary device 450 on a buffer-set-by-buffer-set basis in this way, asynchronous copy can be performed with the order of data being guaranteed.

(6) When the primary device 410 receives a notification from the secondary device 450 that the buffer set data sent has been loaded into the secondary volume 460, the control module #00 in the primary device 410 frees the buffer set in which the buffer set data was stored. If there is buffer set data saved in the save buffer 431, the control module #00 performs staging to store the oldest-generation buffer set data, for example, among the buffer set data saved in the save buffer 431 into the freed buffer set. In the example in FIG. 4, the buffer set data that was stored in the save buffer 431 is staged to buffer set b with buffer set number 03.

(7) When the host computer 480 issues an untransfer suspend command to the primary device 410 during execution of asynchronous copy, the control module #00 sends all buffer set data stored in the cache buffers 411 and 413 to the secondary device 450. The "all buffer set data" are "all buffer set data" used in the session specified in the untransfer suspend command.

Once all buffer set data stored in the cache buffers 411 and 413 have been output to the secondary device 450, the control module #00 suspends the session specified by the untransfer suspend command.

Once the session has been suspended, the control module #00 stages the buffer set data stored in the save buffer 431 and stores in the copy bitmap 441 the location of the storage area in the primary volume 420 in which the staged buffer set data has been written. When the control module #00 receives an I/O instruction from the host computer 480 during the suspend state, the control module #00 writes write data in the primary volume 420 according to the I/O instruction. The control module #00 then stores in the copy bitmap 441 the location of the storage area in the primary volume 420 in which the write data has been written. This is done in order to reflect the buffer set data that was stored in the save buffer 431 when the untransfer suspend command was received and the data in the primary volume 420 updated after the reception of the untransfer suspend command in the secondary device 450 when a resume command is received.

While the primary device 410 and the secondary device 450 are interconnected through the network 470 in FIG. 4, they may be interconnected through an exclusive line or radio in such a manner that they can communicate with each other.

While each of the primary device 410 and the secondary device 450 is illustrated as being a RAID device that includes two control modules in FIG. 4, it is not intended to limit the number of the control modules. The primary and secondary devices 410 and 450 may be any distributed cache memory RAID devices and it is not intended to limit the numbers of control modules and cache buffers.

While the cache memories 411 and 412 are illustrated as independent storage units in FIG. 4 for readily understanding, the cache memories 411 and 412 may be storage areas that are part of a single storage unit, of course.

While the primary volume 420, the save buffer 431 and the copy bitmap 441 are illustrated as independent storage units in FIG. 4 for readily understanding, they may be implemented by one or more storage units.

While eight buffer sets are provided in each of the cache buffers 411 and 413 in the example in FIG. 4, it is not intended to limit the number of buffer sets, of course.

The data storing means, the saving means, the data set output means, the restoration means, and the suspending means in the configuration described above and illustrated in FIG. 4 can be implemented by the control modules #00 and #01 executing a predetermined program.

The first storage means can be implemented by the primary volume 420. The second storage means can be implemented by the send data buffers 411*a* and 413*a*. The third storage means can be implemented by the save buffer 431. Fourth storage means can be implemented by the copy bitmap 441. The set of data can be implemented by buffer set data.

FIG. 5 illustrates exemplary session management tables 500 according to the present embodiment.

Each of the session management tables 500 contains a session status and a session number. The session management table 500 further includes an untransfer suspend command dequeue monitoring generation number, an untransfer monitoring generation number, an untransfer suspend process flag, an untransfer suspend queue next, and an untransfer suspend queue prev.

The session status is information indicating the status of the session. In the session status field, "Active", "Copying", or "Suspend" is set. "Active" indicates that the session is being executed. "Copying" indicates an unactivatable state. "Copying" is set for example when a resume process is performed. "Suspend" indicates that the session is being suspended.

The session number is an identification number assigned to each session.

The untransfer suspend command dequeue monitoring generation number is information indicating the generation number of the oldest buffer set data among the buffer set data stored in a buffer set used for staging when an untransfer suspend command is received. If there is no relevant buffer set data, "0xFFFF", for example, can be set.

The untransfer monitoring generation number is information indicating the generation number of the newest buffer set data among the buffer set data stored in a buffer set when an untransfer suspend command is received. If there is no relevant buffer set data, "0xFFFF", for example, can be set.

The untransfer suspend process flag is information indicating whether the session is to be subjected to the untransfer suspend process or not. If the untransfer suspend process flag is "on", it indicates that the session is to be subjected to the untransfer suspend process; if the untransfer suspend process flag is "off", it indicates that the session is not to be subjected to the untransfer suspend process.

The untransfer suspend command queue next is information indicating the session to be subjected to a process by an untransfer suspend command next to the current session. The untransfer suspend command queue prev is information indicating the session subjected to a process by an untransfer suspend command previous to the current session. If there is no relevant session, "0xFFFF", for example, can be set in the untransfer suspend command queue next and the untransfer suspend command queue prev.

In the example in FIG. 5, a session management table 501 with session number 0 and a session management table 502 with session number 1 are illustrated.

FIG. 6 illustrates an exemplary buffer management table 600 according to the present embodiment. The buffer management table 600 contains an untransfer suspend command queue top and an untransfer suspend command queue btm. The buffer management table 600 also contains a write-back buffer set top and a write-back buffer set btm. The buffer management table 600 also contains a staging buffer set top and a staging buffer set btm. The buffer management table 600 also contains a write-back pointer and a staging pointer.

The untransfer suspend command queue top indicates the first session among the sessions to be subjected to a process by an untransfer suspend command. The untransfer suspend command queue btm indicates the last session among the sessions to be subjected to the process by the untransfer suspend command.

Sessions to be subjected to the process by the untransfer suspend command are managed by queue control using the untransfer suspend command queue top, the untransfer suspend command queue btm, the untransfer suspend command queue next, and the untransfer suspend command queue prev.

A session number is set in the untransfer suspend command queue top and the untransfer suspend command queue btm. If there is no relevant session, "0xFFFF", for example, can be set.

The write-back buffer set top and the write-back buffer set btm are information for managing one or more consecutive buffer sets used for write-back. The write-back buffer set top indicates the first buffer set among the buffer sets to be used for write-back. The write-back buffer set btm indicates the last buffer set among the buffer sets to be used for write-back.

A buffer set number is set in the write-back buffer set top and the write-back buffer set btm.

In the example in FIG. 6, buffer sets with buffer set numbers 2 and 3 are used for write-back. However, the buffer sets used for write-back can be varied according to the availability of the buffer sets.

The staging buffer set top and the staging buffer set btm are information used for managing one or more consecutive buffer sets used for staging. The staging buffer set top indicates the first buffer set among the buffer sets to be used for staging. The staging buffer set btm indicates the last buffer set among the buffer sets to be used for staging.

A buffer set number is set in the staging buffer set top and the staging buffer set btm.

In the example in FIG. 6, buffer sets with buffer set numbers 0 and 1 are used for staging. However, buffer sets use for staging can be varied according to the availability of buffer sets.

The write-back pointer is information containing the generation number of buffer set data to be written back. The staging pointier is information containing the generation number of the last buffer set data staged.

FIG. 7 illustrates exemplary buffer set tables 700 according to the present embodiment.

Each buffer set table 700 contains a buffer set number, a generation number, a buffer set link prev, and a buffer set link next.

The buffer set number is an identification number assigned to each buffer set.

The generation number is an identification number assigned to each set of buffer set data. For example, when buffer set data is stored in a buffer set for the first time, a generation number is assigned to the buffer set data.

The buffer set link prev is information indicating the buffer set number of a buffer set queued previous to the current buffer set. The buffer set link next is information indicating the buffer set number of a buffer set queued next to the current buffer set. Buffer sets are managed by queue control using the buffer set link prev and the buffer set link next. By performing asynchronous copy on a buffer-set-by-buffer-set basis, the order of the data can be guaranteed.

FIG. 7 illustrates buffer set tables 701 to 704 for buffer sets with buffer set numbers 00 to 03.

Figure 8:
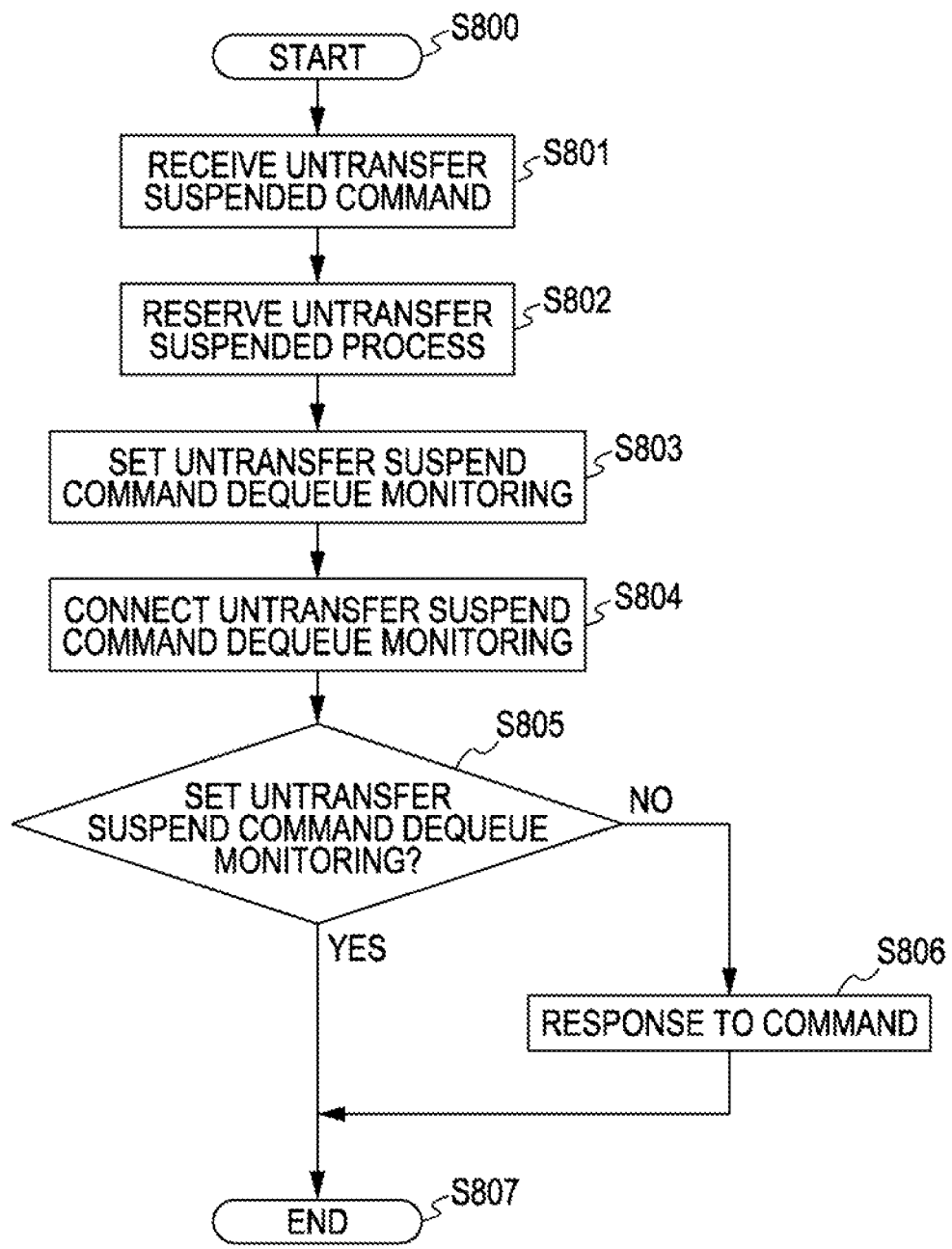
FIG. 8 is a flowchart of an untransfer suspend command receiving process according to the second embodiment.
Figure 9:
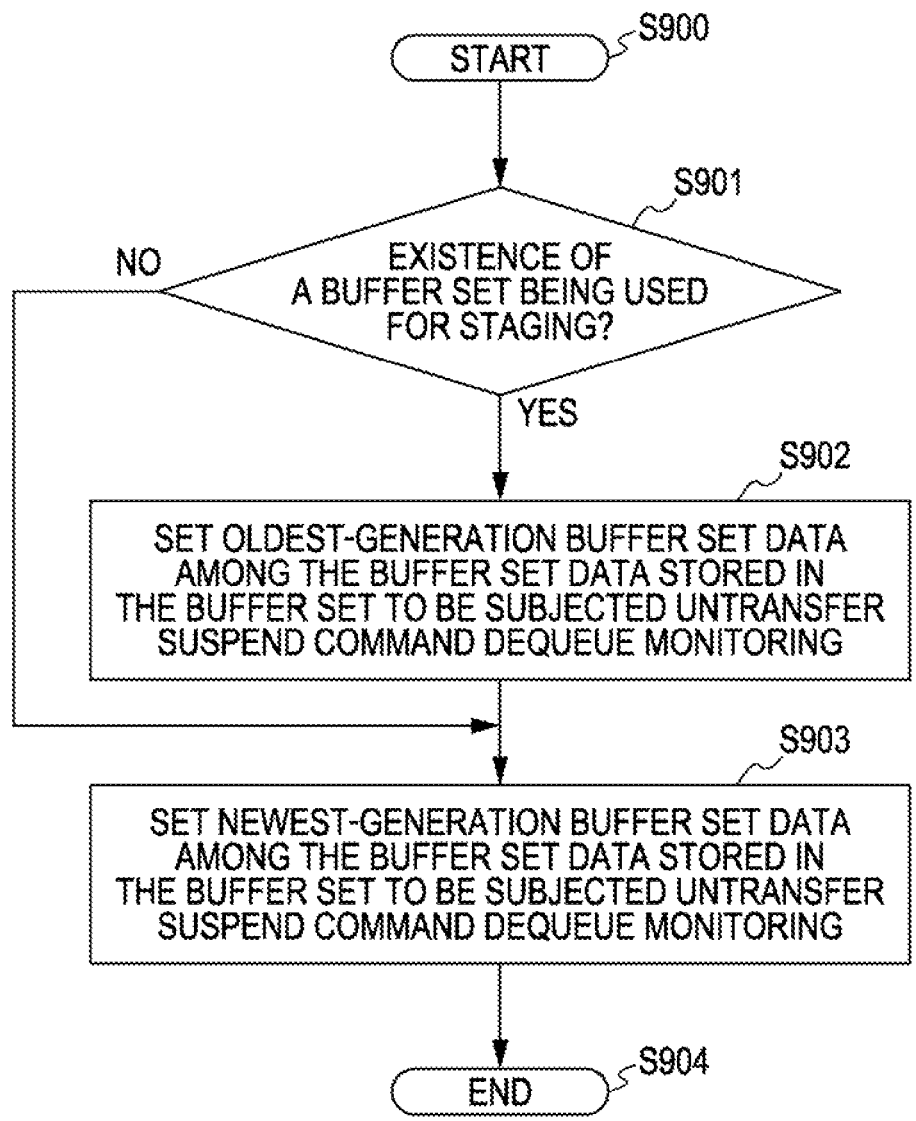
FIG. 9 is a flowchart of an untransfer suspend command dequeue monitoring setting process according to the second embodiment.

FIGS. 8 and 9 are flowcharts of an untransfer suspend command receiving process according to the present embodiment.

When receiving an untransfer suspend command at step S801, the control module #00 starts the following process.

At step S802, the control module #00 makes a reservation for an untransfer suspend process. For example, the control module #00 refers to the session management table 500 of a session specified when an untransfer suspend command is executed and sets the untransfer suspend process flag to "ON". By setting the untransfer suspend command flag to "ON", a reservation for the untransfer suspend process is made.

In the present embodiment, a reservation for the untransfer suspend process is made when an untransfer suspend command is received, so that un untransfer suspend command can be executed asynchronously.

The session for which a reservation for the untransfer suspend process has been made is subjected to untransfer suspend command dequeue monitoring, which will be described later with reference to FIG. 14, until the location of the storage area in which buffer set data stored in the cache buffers 411 and 413 have been written, which will be identified at step S803, is stored in the copy bitmap 441. After completion of the untransfer suspend command dequeue monitoring, the session for which a reservation for the untransfer suspend process has been made is placed in the suspend state by a suspend process, which will be described later with reference to FIG. 15.

At step S803, the control module #00 makes untransfer suspend command dequeue monitoring setting. At step S803, a range of buffer set data to be sent to the secondary device 450 is identified before suspend. The range of buffer set data is determined by the untransfer suspend command dequeue monitoring generation number and the untransfer monitoring generation number set in the process illustrated in FIG. 9.

At step S804, the control module #00 places the session to be subjected to the untransfer suspend process in the untransfer suspend command queue. For example, the control module #00 refers to the session management table 500 of the session to be subjected to the untransfer suspend process and sets in the untransfer suspend command queue prev the value of the untransfer suspend command queue btm in the buffer management table 600. The control module #00 changes the untransfer suspend command queue btm in the buffer management table 600 to the session number of the session to be subjected to the untransfer suspend process.

At step S805, the control module #00 determines whether or not untransfer suspend command dequeue monitoring is set. In the present embodiment, when there is a session placed in the untransfer suspend command queue, untransfer suspend command dequeue monitoring is performed. The control module #00 therefore refers to the untransfer suspend command queue top and the untransfer suspend command queue btm in the buffer management table 600, for example, and, if a session is set in the untransfer suspend command queue top or btm, the control module #00 can determine that untransfer suspend command dequeue monitoring is set.

If the untransfer suspend command dequeue monitoring is set (YES at step S805), the control module #00 ends the untransfer suspend command receiving process (step S807). On the other hand, if the untransfer suspend command dequeue monitoring is not set (NO at step S805), the control module #00 makes a command response indicating the completion of execution of the untransfer suspend command (step S806). The control module #00 then ends the untransfer suspend command receiving process (step S807).

FIG. 9 is a flowchart of a process for untransfer suspend command dequeue monitoring setting process (step S803) according to the present embodiment.

When the control module #00 proceeds to step S803 in step S805, the control module #00 starts the following process (step S900).

At step S901, the control module #00 determines whether or not there is a buffer set being used for staging. For example, the control module #00 refers to the buffer management table 600 and if a buffer set number is set in the staging buffer set top and the staging buffer set btm, the control module #00 can determine that there is a buffer set being used for staging.

If there is a buffer set being used for staging (YES at step S901), the control module #00 proceeds to step S902. In this case, the control module #00 sets the oldest-generation buffer set data among the buffer set data stored in the buffer set used for staging as the buffer set data to be subjected to untransfer suspend command dequeue monitoring (step S902).

At step S902, the control module #00 performs the following operation, for example.

First, the control module #00 refers to the buffer management table 600. The control module #00 then refers to the buffer set table 700 with the buffer set number stored in the staging buffer set btm. Since buffer set number 1 is set in the staging buffer set btm in the buffer management table 600 in FIG. 6, the control module #00 refers to buffer set table 702 having buffer set number 1 in FIG. 7 in this case.

The control module #00 sets the generation number stored in the buffer set table 700 in the untransfer suspend command dequeue monitoring generation number field in the session management table 500 of the session to be subjected to the untransfer suspend process. Since in this case generation number 16 is set in the buffer set table 702 in FIG. 7, the control module #00 sets generation number 16 in the untransfer suspend command dequeue monitoring generation number field in the session management table 500 of the session to be subjected to the untransfer suspend process. The control module #00 then proceeds to step S903.

On the other hand, if there is no buffer set being used for staging (NO at step S901), the control module #00 proceeds to step S903.

At step S903, the control module #00 sets the newest-generation buffer set data among the buffer set data stored in the buffer sets as the buffer set data to be subjected to untransfer monitoring.

At step S903, the control module performs the following operation, for example.

First, the control module #00 refers to the buffer management table 600. The control module #00 then refers to the buffer set table 700 with the buffer set number stored in the write-back buffer set btm. Since buffer set number 3 is stored in the write-back buffer set btm in the buffer management table 600 in FIG. 6, the control module #00 refers to the buffer set table 704 with buffer set number 3 in FIG. 7 in this case.

The control module #00 then sets the generation number stored in the buffer set table 700 in the untransfer monitoring generation number field of the session management table 500 of the session to be subjected to the untransfer suspend process. Since generation number 32 is stored in the buffer set table 704 in FIG. 7, the control module #00 in this case sets generation number 32 in the untransfer monitoring generation number field in the session management table 500 of the session to be subjected to the untransfer suspend process.

Upon completion of the process described above, the control module #00 ends the untransfer suspend command dequeue monitoring setting process and proceeds to step S804 in FIG. 8.

Figure 10:
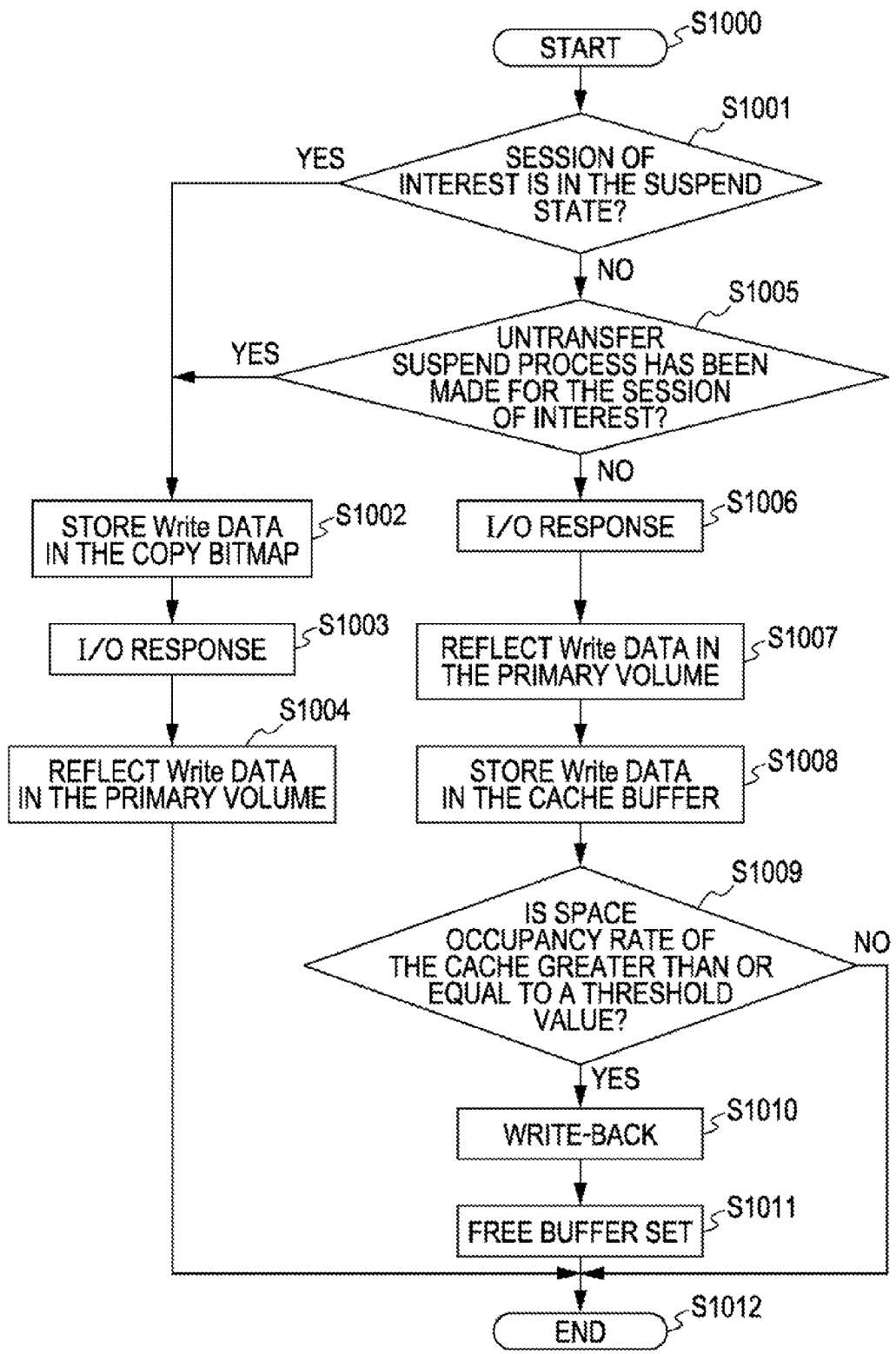
FIG. 10 is a flowchart of an I/O process according to the second embodiment.

FIG. 10 is a flowchart of an I/O process according to the present embodiment.

When receiving an I/O instruction such as a write instruction from the host device, the control module #00 starts the following process (step S1000).

At step S1001, the control module #00 determines whether or not the session to which the I/O instruction received belongs is in the suspend state. The session to which the I/O instruction received belongs is hereinafter referred to as the "session of interest".

For example, the control module #00 refers to the session management table 500 of the session of interest. If "Suspend" is set in the session status field, the control module #00 can determine that the session of interest is in the suspend state.

If the session of interest is in the suspend state (YES at step S1001), the control module #00 proceeds to step S1002. In this case, the control module #00 stores in the copy bitmap 441 the location of the storage area in the primary volume 420 where the received write data has been written (step S1002). Specifically, one bit contained in the copy bitmap 441 has been associated with the location of each storage area having a predetermined size contained in the primary volume 420. The control module #00 sets "1" in the bit associated with the location of the storage area updated with the write data.

At step S1003, the control module #00 sends an I/O response to the received I/O instruction to the host computer 480. At step S1004, the control module #00 reflects the received write data in the primary volume 420.

On the other hand, if the session of interest is not in the suspend state (NO at step S1001), the control module #00 proceeds to step S1005. In this case, the control module #00 determines whether or not a reservation for the untransfer suspend process has been made for the session of interest (step S1005). For example, if the untransfer suspend process flag in the session management table 500 of the session of interest is set to "ON", the control module #00 can determine that a reservation for the untransfer suspend process has been made for the session of interest.

If a reservation for the untransfer suspend process has been made for the session of interest (YES at step S1005), the control module #00 proceeds to step S1002. In this case, the control module #00 performs steps S1002 to S1004 described above.

If a reservation for the untransfer suspend process has not been made for the session of interest (No at step S1005), the control module #00 proceeds to step S1006. In this case, the control module #00 makes an I/O response to the I/O instruction received (step S1006). The control module #00 reflects the received write data in the primary volume 420 at step S1007.

At step S1008, the control module #00 distributes the received write data across a buffer set, that is, a send data buffer 411a in the cache buffer 411 and a send data buffer 413a in the cache buffer 413.

Here, the control module #00 sets a new generation number in the buffer set table 700 of the buffer set in which the write data has been stored and updates the link to other buffer set tables. For example, the control module #00 sets the buffer set number of the buffer set that was previously at the top in the buffer set link next in the buffer set table 700 of the buffer set in which the write data is stored and sets "NONE" in the buffer set link prev. The control module #00 sets the new generation number in the buffer set link prev in the buffer set table 700 of the buffer set that was previously at the top.

If the space occupancy rate of the cache buffers is greater than or equal to a threshold value (YES at step S1009), the control module #00 proceeds to step S1010. In this case, the control module #00 performs a write-back for the newest buffer set data among the buffer set data stored in the buffer sets (step S1010).

First, the control module #00 calculates the address of a save buffer set in the save buffer 431 in which the write-back buffer set data is to be stored. The control module #00 then stores the write-back buffer set data at the calculated address. The buffer set data may include information in the buffer set table 700, for example, such as the generation number, the buffer set link prev, and the buffer set link next, for example, in order to guarantee the order of the buffer set data.

The initial address of the save buffer set can be calculated by adding "(write-back pointer 1)×save buffer set size" to a predetermined "initial address" if the save buffer 431 is consecutive address spaces.

Upon completion of the write-back, the control module #00 sets the generation number of the buffer set data which the write-back have been made in the write-back pointer in the buffer management table 600. The control module #00 then frees the buffer set from which the write-back have been made (step S1011).

On the other hand, if the space occupancy rate of the cache buffers is lower than the threshold value (NO at step S1009), the control module #00 proceeds to step S1012.

When the process described above has been completed, the control module #00 ends the I/O process (step S1012).

FIGS. 11 to 16 are flowcharts of asynchronous copy according to the present embodiment.

Figure 11:
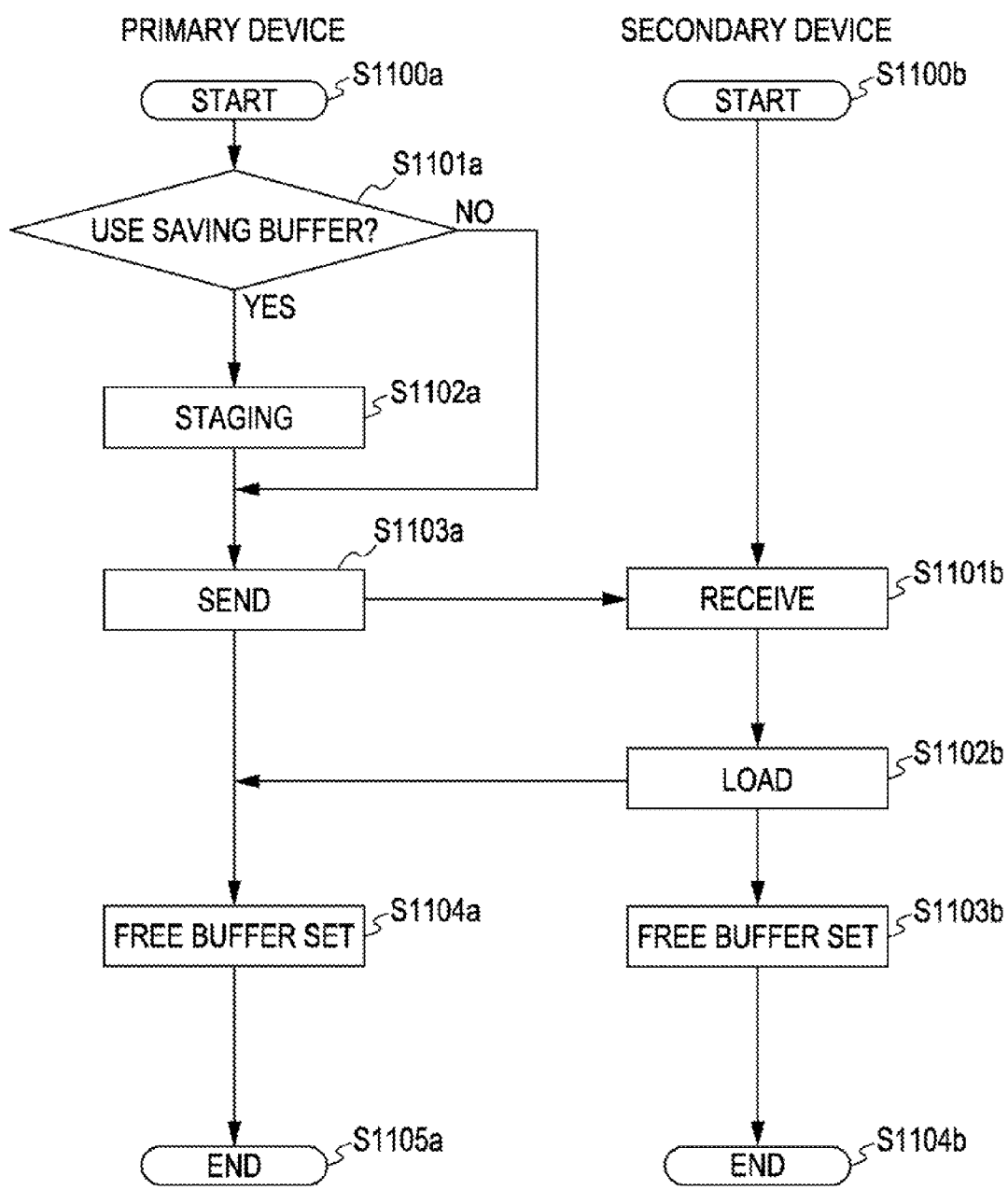
FIG. 11 is a flowchart generally illustrating asynchronous copy according to the second embodiment.

FIG. 11 is a flowchart generally illustrating asynchronous copy according to the present embodiment. An overview of asynchronous copy from the primary device 410 to the secondary device 450 is illustrated in FIG. 11.

At step S1101a, the control module #00 determines whether the save buffer 431 is being used or not. For example, if buffer set data is stored in the save buffer 431, the control module #00 can determine that the save buffer 431 is being used.

The control module #00 can perform the following operations (a) to (d) to determine whether or not there is buffer set data saved in the save buffer 431.

(a) The control module #00 refers to the buffer management table 600 to obtain the write-back pointer and the staging pointer.

(b) The control module #00 searches through the buffer set tables 700 in ascending order of generation number, starting from the buffer set table 700 with the generation number that is equal to the stage pointer plus 1, for a missing generation.

For example, generation number 14 is set as the stage pointer in the buffer management table 600 in FIG. 6. The control module #00 searches through the buffer set tables 700 in ascending order of generation number, starting from the buffer set table 701 of the buffer set with generation number 14 plus 1, namely generation number 15. The control module #00 finds that the buffer set table 700 with generation number 17 is missing.

(C) The control module #00 searches through the buffer set tables 700 in descending order, starting from the buffer set table 700 with the generation number that is equal to the write-back pointer minus 1, for a missing generation.

For example, generation number 33 is set as the write-back pointer in the buffer management table 600 in FIG. 6. The control module #00 searches through the buffer set tables 700 in descending order, starting from the buffer set table 704 of the buffer set with generation number 33 minus 1, namely 32. The control module #00 finds that the buffer set table 700 with generation number 30 is missing.

(d) As a result of the process described above, it is found that the buffer set data with generation numbers 17 to 30 are saved in a save buffer 431.

If the save buffer 431 is being used (YES at step S1101a), the control module #00 proceeds to step S1102a. If there is a freed buffer set, the control module #00 performs staging to store the oldest-generation buffer set data among the buffer set data stored in the save buffer 431 into the freed buffer set (step S1102a).

Upon completion of the staging, the control module #00 sets the generation number of the staged buffer set data in the staging pointer in the buffer management table 600. The control module #00 also updates the buffer set table 700 of the buffer set in which the buffer set data has been stored. The update can be made by using information in the buffer set tables 700, for example the generation number, buffer set link prev, and buffer set link next, stored in the save buffer set along with the buffer set data during the write-back.

Upon completion of the staging, the control module #00 proceeds to step S1103a. The control module #00 also proceeds to step S1103a if no disk buffer is used (NO at step S1101a).

At step S1103a, the control module #00 performs matching process and then sends the buffer set data stored in the buffer sets to the secondary device 450 in the order of generations, the oldest first.

When the control module #10 in the secondary device 450 receives the buffer set data from the primary device 410 at step S1101b, the control module #01 stores the buffer set data received in the buffer set determined by matching process. At step S1102b, the control module #10 loads the buffer set data stored in the buffer set into the secondary volume 460. After completion of the loading of the buffer set data into the secondary volume 460, the control module #10 notifies the primary device 410 of the completion of the loading of the buffer set data into the secondary volume 460. At step S1103b, the control module #10 frees the buffer set from which the buffer set data has been loaded into the secondary volume 460. The control module #10 then ends the asynchronous copy (step S1104b).

The control module #00, on the other hand, receives the notification of the completion of the loading of buffer set data into the secondary volume 460 from the secondary device 450 at step S1104a. The control module #00 frees the buffer set from which the buffer set data has been loaded into the secondary volume 460. The control module #00 then ends the asynchronous copy (step S1105a).

Figure 12:
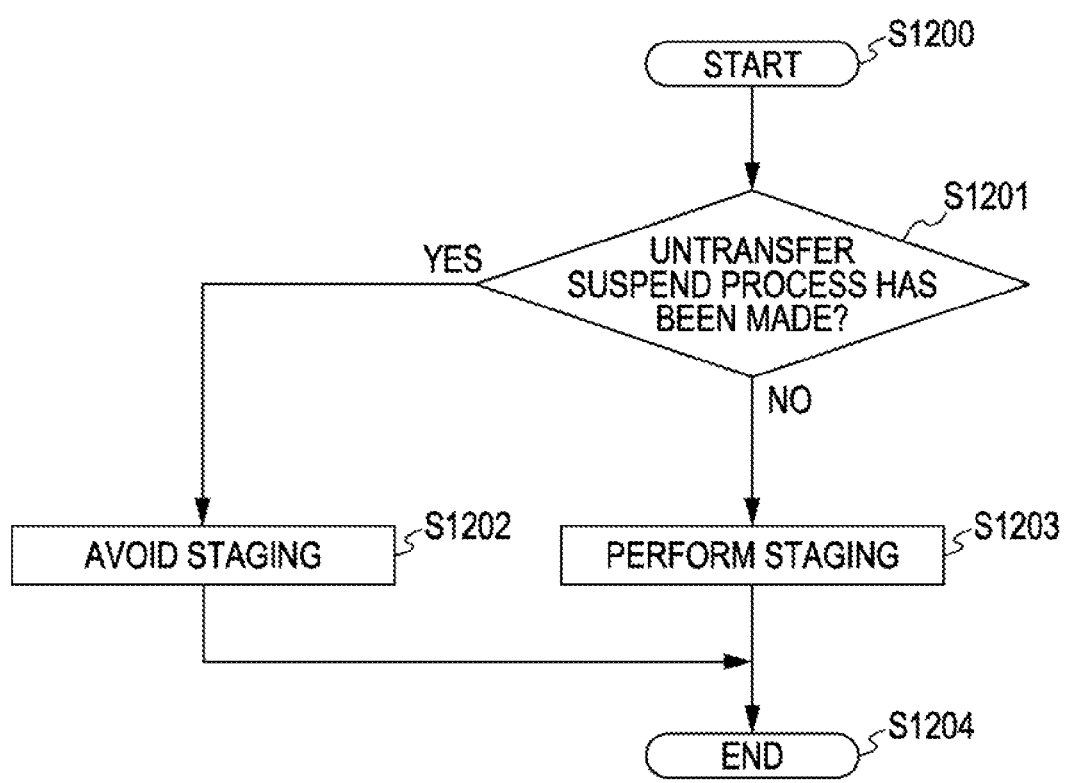
FIG. 12 is a flowchart illustrating staging according to the second embodiment.

FIG. 12 is a flowchart illustrating staging (step S1102a) according to the present embodiment.

When the control module #00 proceeds to step S1102a in FIG. 11, the control module #00 starts the following process (step S1200).

At step S1201, the control module #00 determines whether or not a reservation for an untransfer suspend process has been made for buffer set data to be sent. For example, if the generation number of buffer set data to be staged is greater than the untransfer suspend command dequeue monitoring generation number in the session management table 500 of the session of interest, the control module #00 can determine that a reservation for the untransfer suspend process has been made for the buffer set data.

If the generation number of the buffer set data to be staged is greater than the untransfer monitoring generation number in the session management table 500 of the session of interest, the control module #00 can determine that a reservation for the untransfer suspend process has not been made for the session. The control module #00 also can determine that a reservation for the untransfer suspend process has not been made, if 0xFFFF is set in the untransfer suspend command dequeue monitoring generation number field and the untransfer monitoring generation number field in the session management table 500 of the session of interest.

If a reservation for the untransfer suspend process has been made for the buffer set data to be sent (YES at step S1201), the control module #00 avoids staging (step S1202). The control module #00 ends the process without performing staging (step S1204).

If a reservation for the untransfer suspend process has not been made for the buffers set data to be sent (NO at step S1201), the control module #00 proceeds to step S1203. In this case, the control module #00 performs staging for the oldest-generation buffer set data among the buffer set data stored in the save buffer 431 as follows (step S1203).

First, the control module #00 calculates the address of the save buffer set in which the buffer set data to be staged is stored. The control module #00 then reads the buffer set data from the calculated address and stores the buffer set data into a freed buffer set. The buffer set data may include information in the buffer set table 700, for example the generation number, buffer set link prev, and the buffer set link next, stored in the save buffer set along with the buffer set data during writeback.

The initial address of the save buffer set can be calculated by adding "(staging pointer 1)×save buffer set size" to a predetermined "initial address" if the save buffer 431 is consecutive address spaces.

Upon completion of the staging, the control module #00 sets the generation number of the staged buffer set data in the staging pointer in the buffer management table 600. After completion of the process described above (step S1204), the control module #00 proceeds to step S1103a in FIG. 11.

Figure 13:
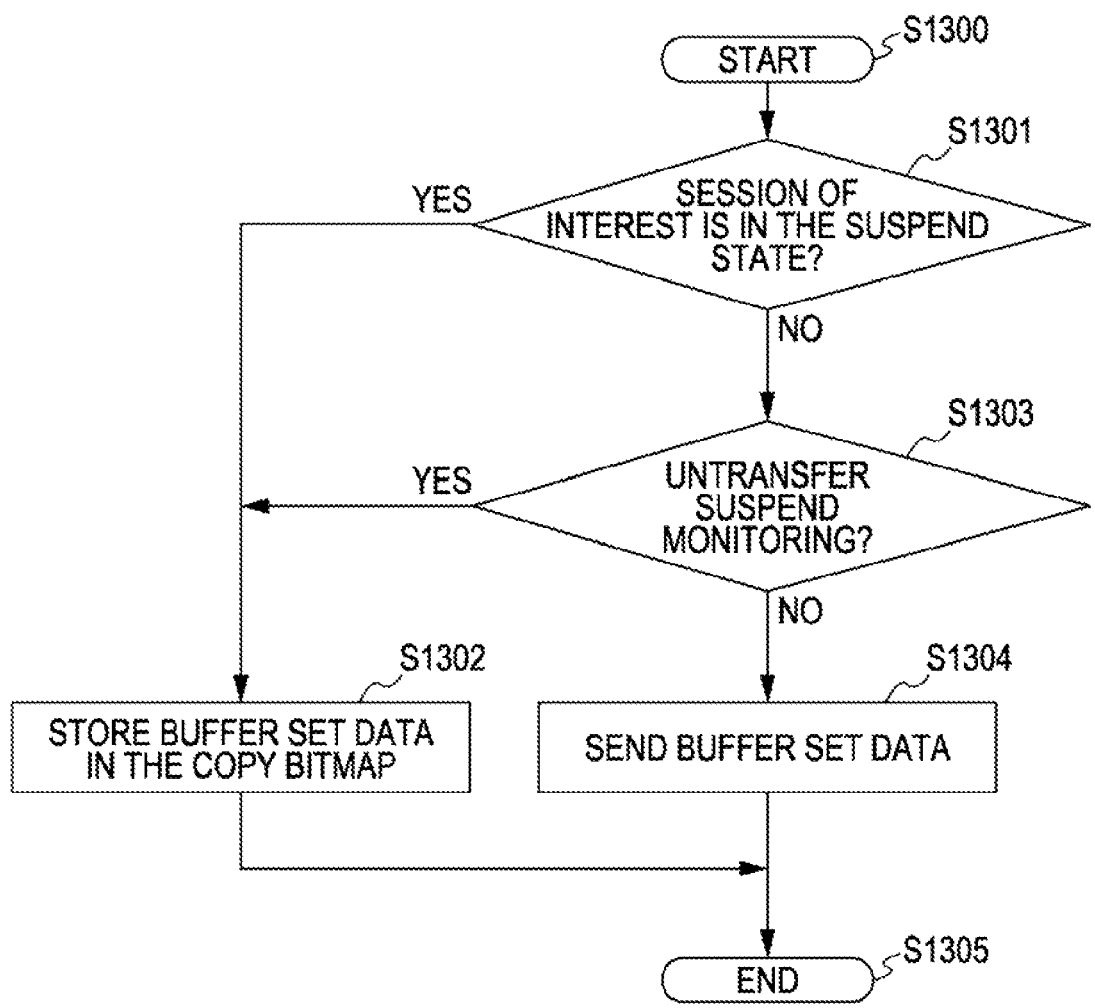
FIG. 13 is a flowchart of a sending process according to the second embodiment.

FIG. 13 is a flowchart of a sending process (step S1103a) according to the present embodiment.

When the control module #00 proceeds to step S1103a in FIG. 11, the control module #00 starts the following process (step S1300).

At step S1301, the control module #00 determines whether the session of interest is in the suspend state or not. For example, the control module #00 can refer to the session management table 500 of the session of interest and, if "Suspend" is set in the session status, can determine that the session of interest is in the suspend state.

If the session of interest is in the suspend state (YES at step S1301), the control module #00 proceeds to step S1302. In this case, the control module #00 stores in the copy bitmap 441 the location of the storage area in the primary volume 420 in which the buffer set data to be sent to the secondary device 450 for the session of interest is written (step S1302).

On the other hand, if the session of interest is not in the suspend state (NO at step S1301), the control module #00 proceeds to step S1303. In this case, the control module #00 determines whether or not the buffer set data to be sent is subjected to untransfer suspend monitoring (step S1303). For example, if the generation number of the buffer set data to be sent is greater than the untransfer suspend command dequeue monitoring generation number in the session management table 500 of the session of interest and less than or equal to the untransfer monitoring generation number, the buffer set data to be sent can be regarded as being subjected to untransfer suspend monitoring.

If the buffer set data to be sent is subjected to untransfer suspend monitoring (YES at step S1303), the control module #00 performs a process at step S1302.

If the buffer set data to be sent is not subjected to untransfer suspend monitoring (NO at step S1303), the control module #00 proceeds to step S1304. In this case, the control module #00 sends the buffer set data to be sent to the secondary device 450 (step S1304).

After completion of the process described above, the control module #00 proceeds to step S1104a in FIG. 11.

Figure 14:
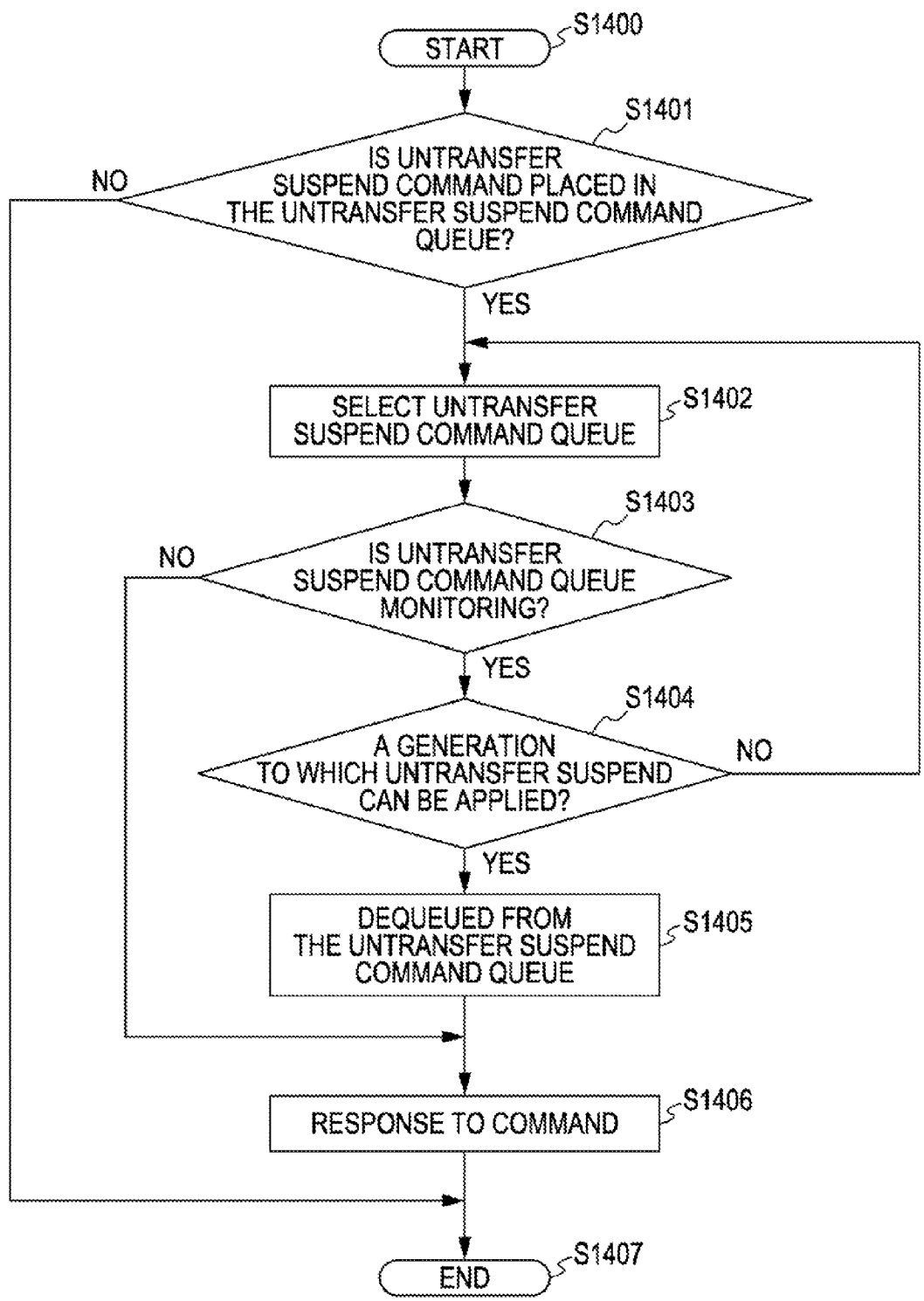
FIG. 14 is a flowchart of an untransfer suspend command dequeue monitoring process according to the second embodiment.

FIG. 14 is a flowchart of an untransfer suspend command dequeue monitoring process according to the present embodiment.

After completion of the process at step S1104a in FIG. 11, the control module #00 starts the following process (step S1400).

At step S1401, the control module #00 determines whether or not an untransfer suspend command is placed in the untransfer suspend command queue. If a session number is set in the untransfer suspend command queue top and the untransfer suspend command queue btm in the buffer management table 600, the control module #00 can determine that an untransfer suspend command is placed in the untransfer suspend command queue.

If no untransfer suspend command is placed in the untransfer suspend command queue (NO at step S1401), the control module #00 ends the untransfer suspend command dequeue monitoring process (step S1407).

If an untransfer suspend command is placed in the untransfer suspend command queue (YES at step S1401), the control module #00 proceeds to step S1402. In this case, the control module #00 selects one session placed in the untransfer suspend command queue (step S1402). In the present embodiment, sessions are selected in order, the one with the session number indicated by the untransfer suspend command queue top in the buffer management table 600 first.

At step S1403, the control module #00 determines whether or not the session selected at step S1402 is subjected to untransfer suspend command dequeue monitoring. For example, if the generation number of a buffer set is set in the untransfer suspend command dequeue monitoring generation number field in the session management table 500, it can be determined that the session with the session number selected at step S1402 is subjected to untransfer suspend command dequeue monitoring.

If the session selected at step S1402 is subjected to untransfer suspend command dequeue monitoring (YES at step S1403), the control module #00 proceeds to step S1404. In this case, the control module #00 determines whether or not the buffer set data to be sent is of a generation to which untransfer suspend can be applied (step S1404).

For example, if the generation number of the buffer set data to be sent is greater than or equal to the untransfer suspend command dequeue monitoring generation number in the session management table 500 of the session selected at step S1402, it can be determined that the buffer set data to be sent is of a generation to which untransfer suspend can be applied.

If the buffer set data to be sent is not of a generation to which untransfer suspend can be applied (NO at step S1404), the control module #00 proceeds to step S1402 and selects the next session.

If the buffer set data to be sent is of a generation to which untransfer suspend can be applied (YES at step S1404), the control module #00 proceeds to step S1405. In this case, the control module #00 dequeues the session selected at step S1402 from the untransfer suspend command queue. Dequeueing can be performed as follows, for example.

The control module #00 refers to the session management table 500 indicated by the session number set in the untransfer suspend command queue top in the buffer management table 600 to obtain the session number set in the untransfer suspend command queue next. The control unit #00 then sets the obtained session number in the untransfer suspend command queue top in the buffer management table 600. If no session number is set in the untransfer suspend command queue next, the control module #00 sets 0xFFFF in the untransfer suspend command queue next and the untransfer suspend command queue prev.

The session dequeued from the untransfer suspend command queue at step S1405 will be subjected to a suspend process illustrated in FIG. 15, which will be described later.

After completion of the process described above, the control module #00 makes a command response indicating the completion of execution of the untransfer suspend command (step S1406). The control module #00 also makes a command response indicating completion of execution of the untransfer suspend command (step S1406) if the session selected at step S1402 is not subjected to untransfer suspend command dequeue monitoring (NO at step S1403). The control module #00 then ends the untransfer suspend command dequeue monitoring process (step S1407).

Figure 15:
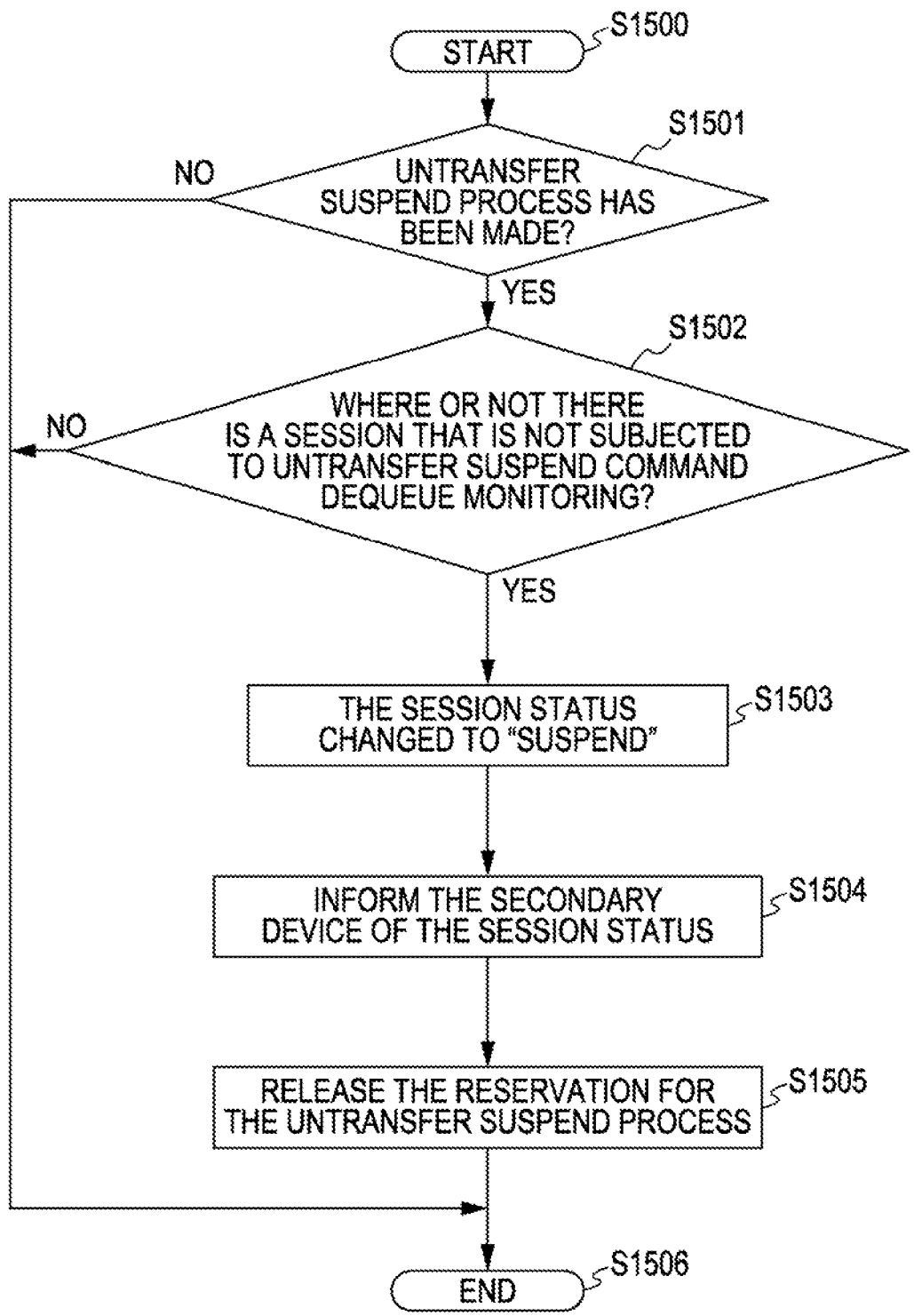
FIG. 15 is a flowchart of a suspend process according to the second embodiment.

FIG. 15 is a flowchart of a suspend process according to the present embodiment.

The control module #00 initiates the following process at regular time intervals (step S1500).

At step S1501, the control module #00 checks to determine whether or not there is a session for which a reservation for the untransfer suspend process has been made. The control module #00 searches through the session management tables 500 for a session for which the untransfer suspend process flag is set to "ON". If the control module #00 finds at least one session for which the untransfer suspend process flag in the session management table 500 is set to "ON", the control module #00 determines that there is a session for which a reservation for the untransfer suspend process has been made.

If there is not a session for which a reservation for the untransfer suspend process has been made (NO at step S1501), the control module #00 ends the suspend process (step S1506). If there is a session for which a reservation for the untransfer suspend process has been made (YES at step S1501), the control module #00 proceeds to step S1502.

At step S1502, the control module #00 determines whether or not there is a session that is not subjected to untransfer suspend command dequeue monitoring among the sessions for which a reservation for untransfer suspend process has been made. Here, the control module #00 obtains the untransfer suspend command queue top and the untransfer suspend command btm from the buffer management table 600. The control module #00 traces the untransfer suspend command queue from the untransfer suspend command queue top to the untransfer suspend command queue btm to determine whether or not a session for which a reservation for the untransfer suspend process has been made is placed in the untransfer suspend command queue. If a session for which a reservation for the untransfer suspend process has been made is placed in the untransfer suspend command queue, the control module #00 can determine that the session for which a reservation for the untransfer suspend process has been made is subjected to untransfer suspend command dequeue monitoring.

If all sessions for which a reservation for the untransfer suspend process has been made are subjected to untransfer suspend command dequeue monitoring (NO at step S1502), the control module #00 ends the suspend process (step S1506). If there is a session that is not subjected to untransfer suspend command dequeue monitoring among the sessions for which a reservation for the untransfer suspend process has been made (YES at step S1502), the control module #00 proceeds to step S1503. In this case, the control module #00 sets "Suspend" in the session status in the session management table 500 of the session for which a reservation for the untransfer suspend process has been made and which is not subjected to untransfer suspend command dequeue monitoring (step S1503).

At step S1504, the control module #00 informs the secondary device 450 of the state of the session whose session status has been changed at step S1503. For example, the control module #00 sends the session management table 500 of the session whose session status has been changed at step S1503 to the secondary device 450. On the secondary device 450, the information in the session management table 500 sent from the primary device 410 is reflected in a session management table 500', not depicted, provided in the secondary device 450.

After completion of the process described above, the control module #00 proceeds to step S1505. The control module #00 releases the reservation for the untransfer suspend process for the session with the session status changed to "Suspend" at step S1503.

For example, the control module #00 refers to the session management table 500 of the session with the session status changed to "Suspend" at step S1503 and sets the untransfer suspend process flag to "OFF".

After completion of the process described above, the control module #00 ends the suspend process (step S1506).

Figure 16:
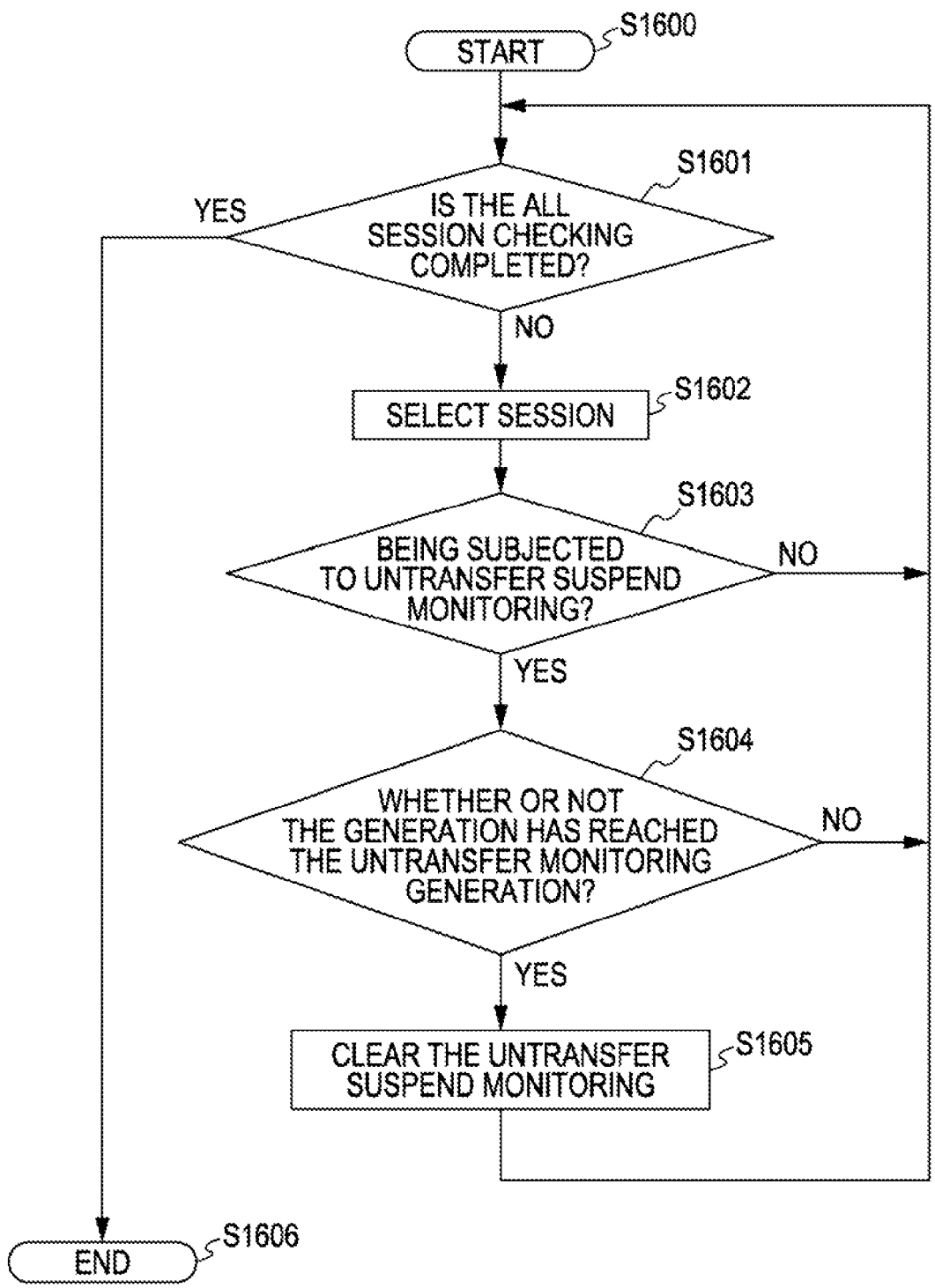
FIG. 16 is a flowchart of an untransfer suspend monitoring process according to the second embodiment.

FIG. 16 is a flowchart of an untransfer suspend monitoring process according to the present embodiment.

After completion of the process at step S1104a in FIG. 11, the control module #00 starts the following process (step S1600).

After the process from step S1601 to step S1606 has been completed for all sessions (YES at step S1601), the control module #00 ends the untransfer suspend monitoring process (step S1606).

If there is a session for which the process from step S1601 to S1606 has not been performed (NO at step S1601), the control module #00 selects one session for which the process from step S1601 to S1606 has not been performed (step S1602).

At step S1603, the control module #00 determines whether or not the session selected at step S1602 is subjected to untransfer suspend monitoring. For example, the control module #00 refers to the session management table 500 of the session selected at step S1602. If the generation number of the buffer set is set in the untransfer monitoring generation number field, the control module #00 can determine that the session selected at step S1602 is subjected to untransfer suspend monitoring.

If the session selected at step S1602 is subjected to untransfer suspend monitoring (YES at step S1603), the control module #00 determines whether or not the generation number of the buffer set data being processed in the session selected at step S1602 has reached the untransfer monitoring generation number (step S1604).

If the generation number of the buffer set data being processed in the session selected at step S1602 has reached the untransfer monitoring generation number (YES at step S1604), the control module #00 clears the untransfer suspend monitoring of the session selected at step S1602 (step S1605). For example, the control module #00 refers to the session management table 500 of the session selected at step S1602. The control module #00 sets a value indicating that untransfer suspend monitoring has been cleared, for example 0xFFFF, in the untransfer suspend command dequeue monitoring generation number field and the untransfer monitoring generation number field. The control module #00 then proceeds to step S1601.

If the session selected at step S1602 is not subjected to untransfer suspend monitoring (NO at step S1603), the control module #00 also proceeds to step S1601. The control module #00 also proceeds to step S1601 if the generation number of the buffer set data being processed in the session selected at step S1602 has not reached the untransfer monitoring generation number (NO at step S1604). After completion of the process described above, the control module #00 ends the untransfer suspend monitoring process (step S1606).

Figure 17:
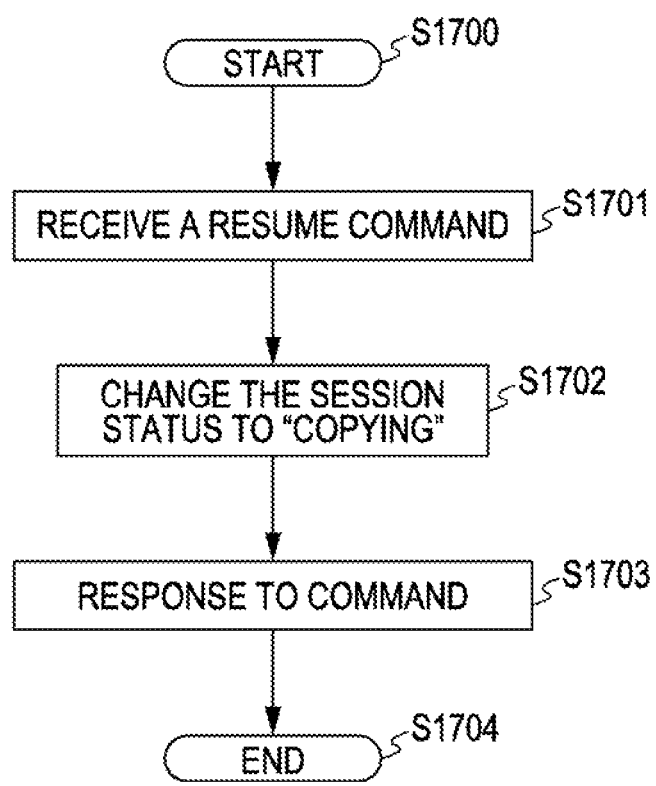
FIG. 17 is a flowchart of a resume command process according to the second embodiment.

FIG. 17 is a flowchart of a resume command process according to the present embodiment.

When receiving a resume command from a host device, for example, the control module #00 initiates the following process (step S1701).

At step S1702, the control module #00 changes the session status of a session specified in the issued resume command to "Copying". For example, the control module #00 refers to the session management table 500 of the session specified in the resume command and changes the session status to "Copying".

For the session whose session status has been set to "Copying" at step S1702, asynchronous copy, which will be described later with reference to FIG. 18, will be performed.

After changing the session status to "Copying", the control module #00 sends a command response to the resume command received at step S1701 to the host device (step S1703).

After completion of the process described above, the control module #00 ends the resume command process (step S1704).

Figure 18:
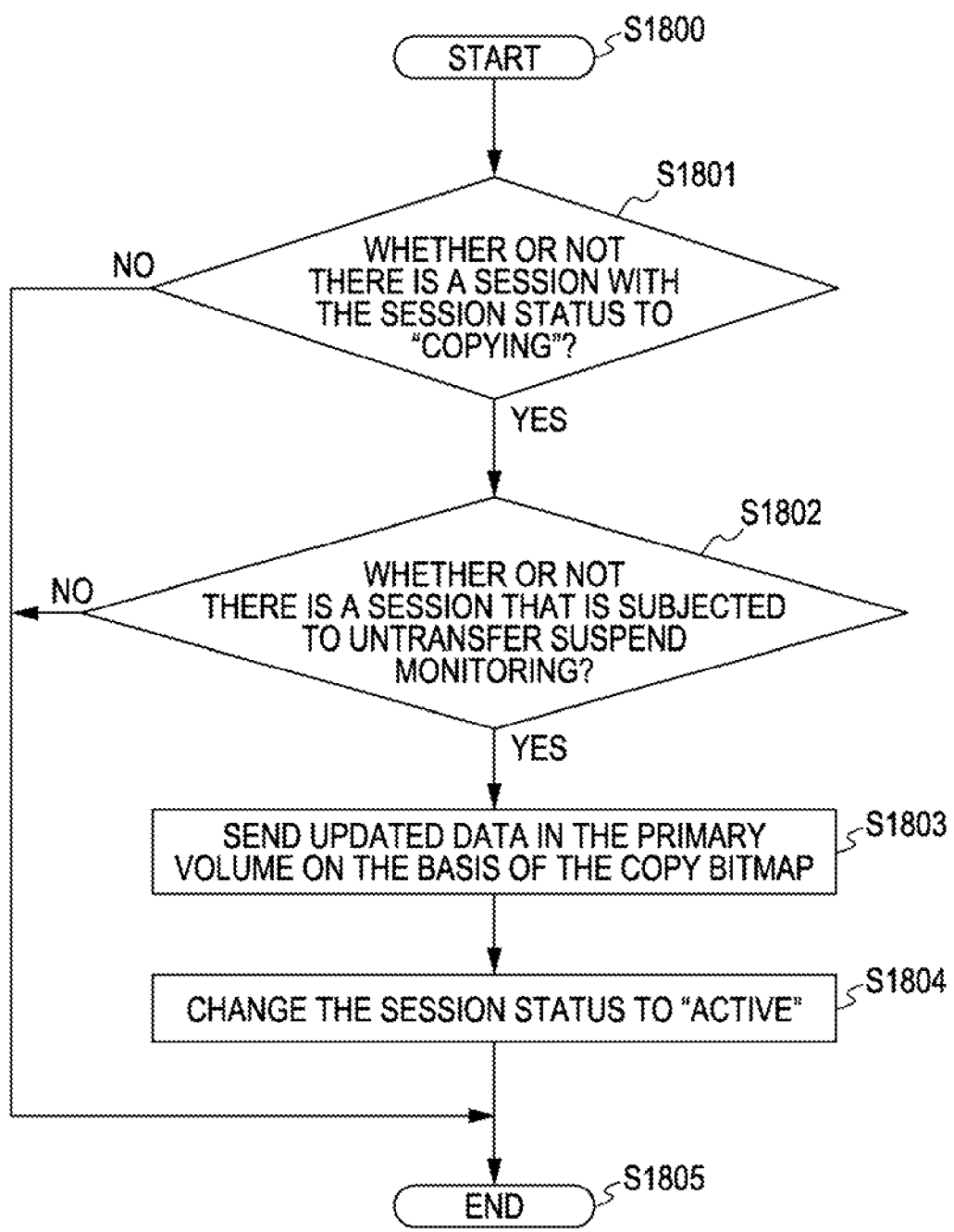
FIG. 18 is a flowchart illustrating asynchronous copy according to the second embodiment.

FIG. 18 is a flowchart illustrating asynchronous copy according to the present embodiment.

The control module #00 initiates the following process at regular time intervals (step S1800).

At step S1801, the control module #00 determines whether or not there is a session with the session status set to "Copying". For example, the control module #00 searches through the session management tables 500 of all sessions for a session with "Copying" set in the session status. If the control module #00 finds a session management table 500 with "Copying" set in the session status, the control module #00 can determine that there is a session with the session status, "Copying".

If there is not a session with the session status, "Copying" (NO at step S1801), the control module #00 ends the asynchronous copy (step S1805). If there is a session with the session status, "Copying" (YES at step S1801), the control module #00 proceeds to step S1802. In this case, the control module #00 determines whether or not there is a session that is subjected to untransfer suspend monitoring among the sessions with the session status, "Copying" (step S1802). For example, if a value indicating that untransfer suspend monitoring has been cleared, for example 0xFFFF, is set in the untransfer monitoring generation number in the session management table 500, the control module #00 can determine that the session is not subjected to untransfer suspend monitoring. If a valid session number is set in the untransfer monitoring generation number in the session management table 500, the control module #00 can determine that the session is subjected to untransfer suspend monitoring.

If there is a session that is not subjected to untransfer suspend monitoring (YES at step S1802), the control module #00 sends updated data in the primary volume 420 of the primary device 410 to the secondary device 450 on the basis of the copy bitmap 441 (step S1803).

When the secondary device 450 receives the data updated in the primary volume 420 from the primary device 410, the secondary device 450 reflects the updated data in the primary volume 420 in the secondary volume 460 provided in the secondary device 450.

At step S1804, the control module #00 accesses the session management table 500 of the session for which the process at step S1803 has been completed and changes the session status to "Active".

After completion of the process described above, the control module #00 ends the asynchronous copy (step S1805). If there is not a session with the session status, "Copying" (NO at step S1801), or if all sessions are subjected to untransfer suspend monitoring (NO at step S1802), the control module #00 ends the asynchronous copy (step S1805).

Figure 19:
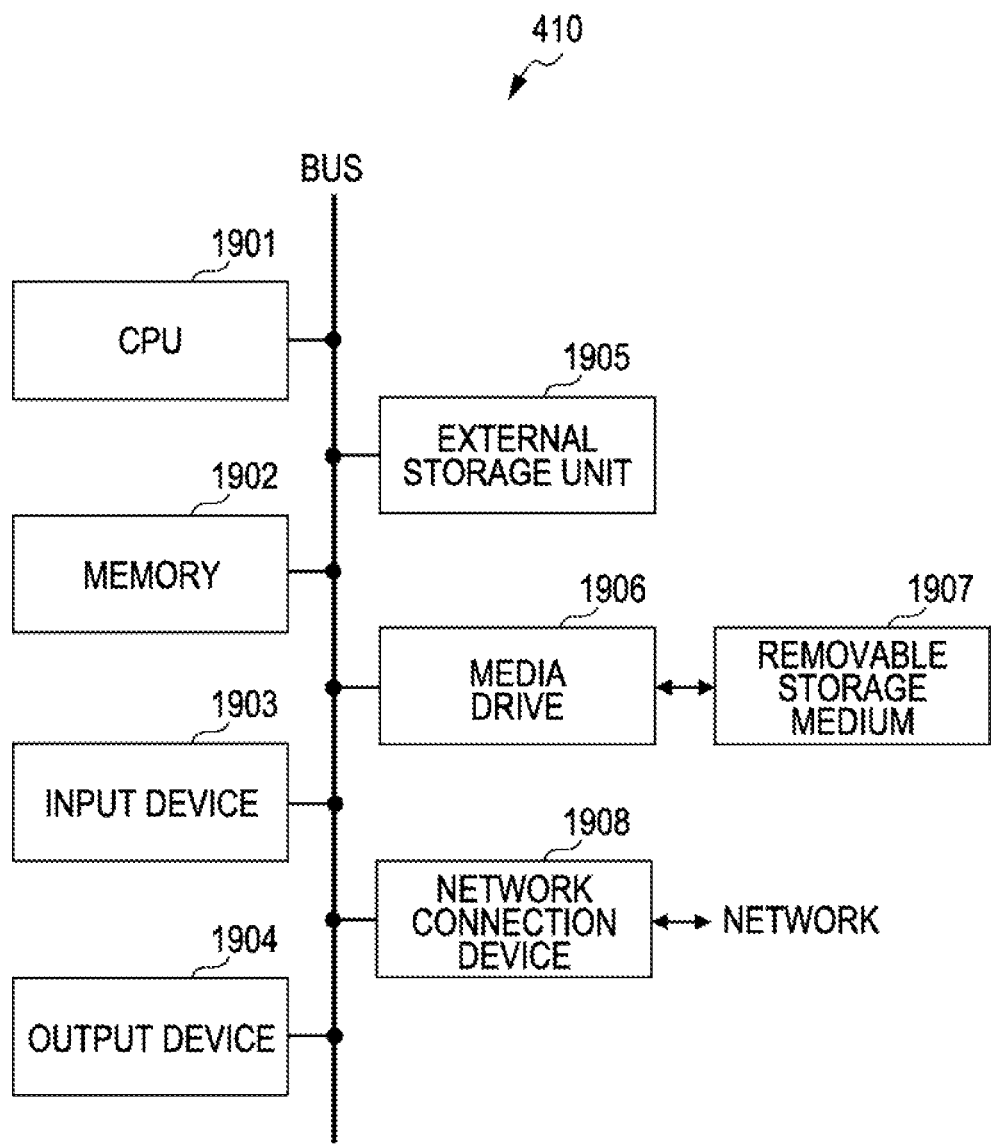
FIG. 19 is a diagram illustrating a detailed exemplary configuration of a control module provided in a primary device according to the second embodiment.

FIG. 19 illustrates an exemplary configuration of a control module provided in the primary device 410 according to the present embodiment in detail. The control modules #00 and #01 can be implemented by the same components and therefore an exemplary configuration of only the control module #00 is illustrated in FIG. 19.

The control module #00 in FIG. 19 includes a CPU 1901, a memory 1902, an input device 1903, an output device 1904, an external storage unit 1905, a media drive 1906 and a network connection device 1908. These devices are connected onto a bus so that they can pass data to and from one another.

The CPU 1901 is a processor that executes a program implementing the asynchronous copy and the untransfer suspend process according to the present embodiment as well as various peripheral and software programs.

The memory 1902 is a volatile storage unit used in execution of a program. The memory 1902 may be a RAM. The memory 1902 can be used as the cache buffer 411.

The input device 1903 is means for inputting data from an external source. The input device 1903 may be a keyboard or mouse.

The output device 1904 is a device that outputs data to another device such as a display device. The output device 1904 may include a display device.

The external storage unit 1905 is a nonvolatile storage unit storing a program implementing the asynchronous copy and the untransfer suspend process according to the present embodiment as well as programs and data required for the control module #00 to operate. The external storage unit 1905 may be a magnetic disk storage unit.

The media drive 1906 is a device that outputs data from the memory 1902 and the external storage unit 1905 to a removable storage medium 1907, for example a floppy disk, an MO disk, a CD-R and a DVD-R and reads programs and data from a removable storage medium 1907.

The network connection device 1908 is a device connecting to a network 1909.

Storage media that are readable by an information processing apparatus, such as the memory 1902, the external storage unit 1905 and the removable storage medium 1907, are non-transitory media.

The exemplary configuration of the control module #00 in FIG. 19 is illustrative only and not all the components illustrated in FIG. 19 are essential.

Operation of a backup system using the storage system 400 described above will be considered below.

Figure 20:
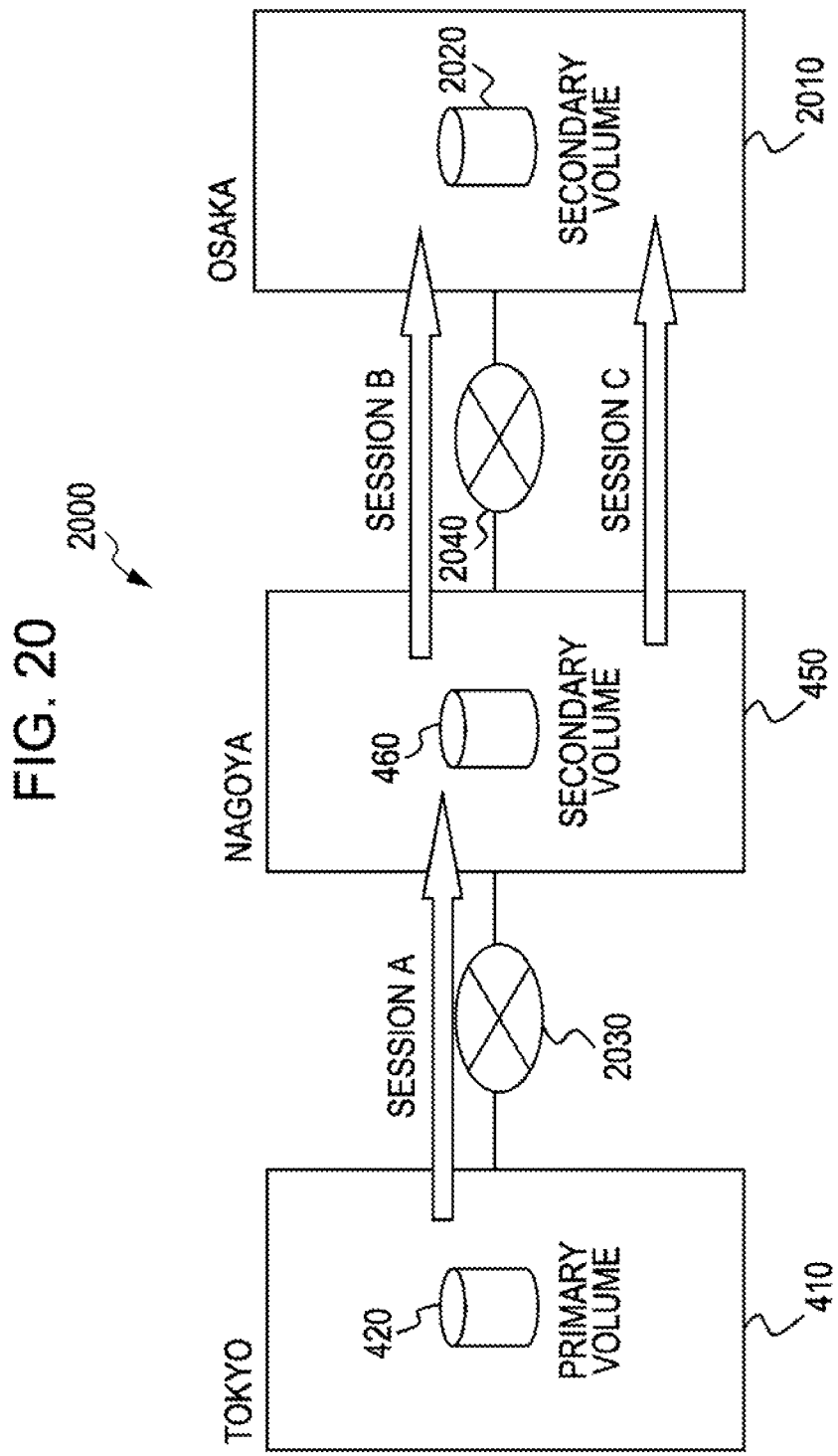
FIG. 20 is a diagram illustrating an exemplary configuration of a backup system using the storage system according to the second embodiment.

A backup system 2000 illustrated in FIG. 20 includes a primary device 410 located in Tokyo, a secondary device 450 located in Nagoya, and a secondary device 2010 located in Osaka. The secondary device 2010 may be a RAID device having the same configuration as the secondary device 450. The secondary device 2010 includes a secondary volume 2020.

The primary device 410 and the secondary device 450 are interconnected through a network 2030 so that they can communicate with each other. The secondary device 450 and the secondary device 2010 are interconnected through a network 2040 so that they can communicate with each other.

FIG. 21 illustrates an example of a backup process performed by the backup system 2000 according to the present embodiment. The times in FIG. 21 are illustrative and are not intended to limit the start times of the processes or the times required for the processes.

Session A is a session executing asynchronous copy from the primary device 410 to the secondary device 450 with the order of data being guaranteed. Sessions B and C execute remote copy from the secondary device 450 to the secondary device 2010.

At 0:00 on 23, the primary device 410 receives an untransfer suspend command and starts an untransfer suspend command process. Here, the primary device 410 sends only the buffer set data stored in the buffer set in the cache buffers 411 and 413 to the secondary volume 460 (NO at step S1303, then step S1304). The primary device 410 suspends the asynchronous copy that guarantees the order of data (S1503).

The buffer set data stored in the buffer set in the primary device 410 when the untransfer suspend command was received is reflected in the secondary device 450 at 0:01 on 23 with the order of the data being guaranteed. When remote copy is executed in session B with the buffer set data reflected in the secondary device 450, the updated data in the secondary device 450 is reflected in the secondary device 2010.

The buffer set data stored in the buffer set in the primary device 410 when the untransfer suspend command was received is backed up to the secondary devices 450 and 2010 at 0:11 on 23 with the order of the data being guaranteed.

The time that elapses between the reception of the untransfer suspend command and the completion of the backup can be short because only the data stored in the cache buffers 411 and 413 are reflected in the secondary devices 450 and 2010.

When the asynchronous copy is suspended, the primary device 410 stores in the copy bitmap 441 the location of the storage area in the primary volume 420 in which the buffer set data stored in the save buffer 431 has been written when the untransfer suspend command has been received (NO at step S1201, then step S1203, YES at step S1301, then step S1302). The primary device 410 also stores in the copy bitmap 441 the location of the storage area in the primary volume 420 in which write data specified in an I/O instruction received in the time period between the reception of the untransfer suspend command and the completion of a resume process was written (YES at step S1001 or YES at step S1005, then step S1002).

At 3:00 on 23, the primary device 410 receives a resume command and starts a resume process for the untransfer suspend. The primary device 410 transfers updated data in the primary volume 420 of the primary device 410 to the secondary device 450 on the basis of the copy bitmap 441 (step S1803). The primary device 410 then clears the suspend state (step S1804).

The resume process following the untransfer suspend can be accomplished in a short time because the resume process is completed simply by reflecting in the secondary device 450 the updated data in the primary volume 420 that has been stored in the copy bitmap 441.

At 3:10 on 23, the buffer set data stored in the save buffer 431 when the untransfer suspend command was received and the write data specified in the I/O instruction received in the time period between the reception of the untransfer suspend command and the completion of the resume process are reflected in the secondary device 450. The data in the secondary device 450 becomes consistent with the data in the primary device 410 at 3:10 on 23.

At 3:10 on 23, the primary device 410 receives a consistency suspend command and initiates a consistency suspend process. The consistency suspend process is a known technique in which the consistency between the primary device 410 and the secondary device 450, for example, is temporarily discontinued, that is, suspended. More specifically, the following process is performed for example.

In response to a consistency suspend command, the primary device 410 suspends synchronous copy. At the same time, the primary device 410 sends all the buffer set data stored in the buffer set on the cache buffers 411 and 413 and the buffer set data stored in the save buffer 431 to the secondary device 450. The primary device 410 also stores in the copy bitmap 441 the location of a storage area in the primary volume 420 in which write data specified in an I/O instruction received in the period between the reception of the consistency suspend command and completion of the resume process was written.

There is little data to be sent from the primary device 410 to the secondary device 450 because the resume process following the untransfer suspend has just been completed. Accordingly, the consistency suspend process is completed in a short time.

Remote copy in session C is made at 3:11 on 23 and updated data in the secondary device 450 is reflected in the secondary device 2010.

At 3:21 on 23, the buffer set data stored in the save buffer 431 when the untransfer suspend command was received and the write data specified in the I/O instruction received in the time period between the reception of the untransfer suspend command and the completion of the resume process are backed up to the secondary devices 450 and 2010.

On the other hand, the primary device 410 receives a resume command at 3:11 on 23 and starts a resume process following the consistency suspend. Here, the primary device 410 transfers the updated data in the primary volume 420 of the primary device 410 to the secondary device 450 on the basis of the copy bitmap 441. The primary device 410 then clears the suspend state. The asynchronous copy is resumed at 3:21.

The resume process following the consistency suspend can be accomplished in a short time because only the updated data in the primary volume 420 and stored in the copy bitmap 441 is reflected in the secondary device 450.

In this way, when the primary device 410 receives an untransfer suspend command, the primary device 410 sends only the buffer set data on the cache buffers 411 and 413 to the secondary device 450 and immediately enters a suspend state. Accordingly, updated data in the primary device 410 can be backed up in a short time in response to the untransfer suspend command with the order of the data being guaranteed.

After reception of the untransfer suspend command, the primary device 410 holds in the copy bitmap 441 the location of the storage area of the buffer set data stored in the save buffer 431 and the location of the storage area in the primary volume 420 in which the write data specified in the I/O instruction was written. Accordingly, the primary device 410 can accomplish the resume process following the untransfer suspend in a short time. The primary device 410 also can accomplish the subsequent consistency suspend in a short time because there is little data to be sent from the primary device 410 to the secondary device 450. Consequently, the updated data in the primary device 410 can be backed up in a short time with the order of the data being guaranteed.

Furthermore, since the data in the primary device 410 is backed up to the secondary devices 450 and 2010 in a short time, the probability that the system may suffer disaster during the backup can be reduced. That is, a highly disaster-tolerant backup can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
    a first storage for storing first data sent from a host device;
    a plurality of second storages for temporarily storing the first data;
    a data storage controller for storing the first data stored in the first storage into one of the plurality of second storages;
    a third storage used for saving a set of data including second data stored in each of the plurality of second storages;
    a saving device for, depending on availability of each of the plurality of second storages, reading the set of data in each of the plurality of second storages and saving the read set of data in the third storage;
    a data set output device for outputting the set of data stored in the each of the plurality of second storages to a copy destination device that is connected to the data set output device and is able to communicate with the data set output device, the set of the data being outputted from the data set output device to the copy destination device in the order in which the data is inputted to the second storage;
    a restoration device for storing the set of data saved in the third storage into available ones of the plurality of second storages; and
    a suspending device for, in response to a suspend instruction, causing the restoration device to end the storing the set of data saved in the third storage into available ones of the plurality of second storages in the restoration device and then after causing the data set output device to output all of the set of data stored in the plurality of second storages to the copy destination device, suspending the output of the set of data by the data set output device to the copy destination device to place the data set output device in a suspend state.

2. The storage apparatus according to claim 1, wherein the suspending device inhibits process of the restoration device in response to the suspend instruction until the data set output device is placed in the suspend state.

3. The storage apparatus according to claim 2, wherein the data set output device after entering the suspend state stores information on a new set of data to be stored in one of the plurality of second storages in fourth storage until the suspend state is cleared.

4. The storage apparatus according to claim 1, wherein the suspending device inhibits the process of the saving device in response to the suspend instruction until the suspend state is cleared.

5. The storage apparatus according to claim 1, wherein the data storage controller stores the first data newly received from the host device in the fourth storage in response to the suspend instruction until the suspend state is cleared.

6. The storage apparatus according to claim 3, further comprising: resume device for outputting information stored in the fourth storage to the copy destination device in response to a resume instruction and then clearing the suspend state.

7. A controller comprising:
    a first storage configured to store first data sent from a host device;
    a plurality of second storages configured to temporarily store the first data;
    a data storage controller configured to store the first data stored in the first storage into one of the plurality of second storages;
    a saving device configured to, depending on availability of each of the plurality of second storages, read a set of data including second data stored in the each of the plurality of second storages and saving the set of data in third storage used for saving the set of data;
    a data set output device configured to output the set of data stored in the each of the plurality of second storages to a copy destination device that is connected to the data set output device and is able to communicate with the data set output device, the set of the data being outputted from the data set output device to the copy destination device in the order in which the data is inputted to the second storage;
    a restoration device configured to store the set of data saved in the third storage into available ones of the plurality of second storages; and
    a suspending device configured to, in response to a suspend instruction, to cause the restoration device to end the storing the set of data saved in the third storage into available ones of the plurality of second storages in the restoration device and then after causing the data set output device to output all of the set of data stored in the plurality of second storages to the copy destination device, to suspend the output of the set of data by the data set output device to the copy destination device to place the data set output device in a suspend state.

8. A control method of controlling a storage apparatus including a first storage for storing first data sent from a host device and a plurality of second storages for temporarily storing the first data, the control method comprising:
    storing the first data stored in the first storage into the second storage;
    depending on the availability of each of the plurality of second storages, reading a set of data including second data stored in the each of the plurality of second storages and saving the set of data in third storage used for saving the set of data;
    outputting the set of data stored in the each of the plurality of second storages to a copy destination device that is connected to the data set output device and is able to communicate with each other, the set of the data being outputted from the data set output device to the copy destination device in the order in which the data is inputted to the second storage;
    storing the set of data saved in the third storage into available ones of the plurality of second storages; and
    in response to a suspend instruction, causing the restoration device to end the storing the set of data saved in the third storage into available ones of the plurality of second storages in the restoration device, and then after outputting all of the set of data stored in the plurality of the second storage to the copy destination device, suspending the output of the set of data to the copy destination device.

9. A computer-readable, non-transitory medium storing a program that causes a controller controlling a storage apparatus to execute a procedure, the controller including first storage for storing first data sent from a host device and a plurality of second storage for temporarily storing the first data, the procedure comprising:

storing the first data stored in the first storage means into the second storage means;

reading a set of data including second data stored in each of the plurality of second storages from the second storage and saving the set of data in third storage means used for saving the set of data, the reading depending on the availability of the second storage;

outputting the set of data stored in the second storage to a copy destination device that is connected to the storage apparatus in such a manner that the storage apparatus and the copy destination device can communicate with each other;

storing the set of data saved in the third storage into available ones of the plurality of second storage means; and in response to a suspend instruction, causing the restoration device to end the storing the set of data saved in the third storage into available ones of the plurality of second storages in the restoration device, and then after outputting all of the set of data stored in the second storages to the copy destination device in the data set output process, suspending the output of the set of data to the copy destination device by the data set output process and placing the data set output process into a suspend state, wherein the set of the data is outputted from the data set output device to the copy destination device in the order in which the data is inputted to the second storage.

* * * * *